United States Patent [19]
Yamasaki et al.

[11] Patent Number: 5,585,914
[45] Date of Patent: Dec. 17, 1996

[54] APPARATUS AND METHOD FOR MEASURING A TEMPERATURE OF A HIGH TEMPERATURE LIQUID CONTAINED IN A FURNACE

[75] Inventors: Mitsuo Yamasaki; Shigeru Inoue; Ichiro Kikuchi; Masaki Komatani; Genji Kanatani; Masao Hiroko; Takafumi Yoshikawa; Masashi Edahiro; Yoshimi Komatsu; Akihiko Inoue; Hideaki Mizukami; Takeshi Murai; Hideo Nakamura; Yoshiro Yamada; Yuji Adachi; Hirofumi Nakamura; Keiichi Miyoshi; Kazusi Miyamoto; Masao Doi; Shirou Takene, all of Kawasaki, Japan

[73] Assignee: NKK Corporation, Tokyo, Japan

[21] Appl. No.: 317,376

[22] Filed: Oct. 4, 1994

[30] Foreign Application Priority Data

| Oct. 5, 1993 | [JP] | Japan | 5-249189 |
| Jun. 13, 1994 | [JP] | Japan | 6-130387 |
| Jun. 17, 1994 | [JP] | Japan | 6-135394 |
| Jun. 29, 1994 | [JP] | Japan | 6-147330 |
| Sep. 14, 1994 | [JP] | Japan | 6-219907 |

[51] Int. Cl.$^6$ .............. G01J 5/48; G01J 5/00; G01K 11/00; G01K 1/12

[52] U.S. Cl. .............. 356/44; 374/131; 374/161; 374/139; 385/12

[58] Field of Search ............ 356/44, 43; 250/227.18, 250/227.23; 374/121, 131, 161, 162, 123, 132, 139, 140; 385/12

[56] References Cited

U.S. PATENT DOCUMENTS

| 4,402,790 | 9/1983 | Lynn et al. | 395/12 |
| 4,468,771 | 8/1984 | Zhukov et al. | 374/139 |
| 4,619,533 | 10/1986 | Lucas et al. | 374/141 |
| 4,650,318 | 3/1987 | Pointer et al. | 359/509 |
| 4,786,188 | 11/1988 | Myhre et al. | 359/509 |
| 4,836,689 | 6/1989 | O'Brien et al. | 359/509 |
| 5,198,662 | 3/1993 | Yamaguchi et al. | 374/162 |
| 5,364,186 | 11/1994 | Wang et al. | 374/131 |

FOREIGN PATENT DOCUMENTS

| 902892 | 1/1986 | Belgium . |
| 0163973 | 12/1985 | European Pat. Off. . |
| 60-129628 | 7/1985 | Japan . |
| 61-91529 | 5/1986 | Japan . |
| 62-19727 | 1/1987 | Japan . |
| 62-132135 | 6/1987 | Japan . |
| 62-226025 | 11/1987 | Japan . |
| 63-20 3716 | 8/1988 | Japan . |
| 5-142049 | 6/1993 | Japan . |
| 5-248960 | 9/1993 | Japan . |
| 2006351 | 5/1979 | United Kingdom . |

*Primary Examiner*—Frank Gonzalez
*Assistant Examiner*—Jason D. Eisenberg
*Attorney, Agent, or Firm*—Frishauf, Holtz, Goodman, Langer & Chick

[57] ABSTRACT

An apparatus and method for measuring a temperature of a high temperature liquid contained in a furnace. An optical fiber covered with a metallic tube is inserted through a passageway inside a nozzle arranged on a furnace wall of the furnace. The nozzle communicates with an interior of the furnace containing the liquid, and gas is supplied into the passageway inside the nozzle to prevent the nozzle from clogging. The metal-covered optical fiber is fed through the passageway inside the nozzle into the liquid such that spectral light radiated from the liquid enters a tip of the metal-covered optical fiber and is propagated therealong. The temperature of the liquid is determined by a radiation thermometer, coupled to the metal-covered optical fiber, based on the spectral light propagated along the metal-covered optical fiber.

30 Claims, 16 Drawing Sheets

APPARATUS AND METHOD FOR MEASURING A TEMPERATURE OF A HIGH TEMPERATURE LIQUID CONTAINED IN A FURNACE

BACKGROUND OF THE INVENTION

1. Field of the Invention

The present invention relates to an apparatus for measuring a temperature of a high temperature liquid using an optical fiber and a method therefor and in particular to the apparatus and the method which allow a continuous measurement.

2. Description of Related Arts

A prior art method for measuring a temperature of molten metal in a furnace such as a converter processing a decarburization of molten iron, one of the steel smelting furnaces, adopts a sublance method or a manually operating thermocouple measurement method. In the sublance method, a thermometer element attached at a tip of a movable lance is inserted through a raw material charge hole on the furnace or other hole to perform the temperature measurement. Accordingly, the sublance method has disadvantages given below.

Firstly, a size of apparatus for measuring a temperature is enlarged in proportion to a size of the furnace. Secondly, replacement of a thermometer element is forcedly required in every measuring cycle because the thermometer element is of a single use disposable type, and further the replacement of the thermometer element is also required. Thirdly, intermittent measurement of the temperature forcedly carried out during operation because the consumption type thermocouple is forcedly replaced in every measurement cycle. And furthermore, frequent measurement is not allowed in view of an economic reason because of the disposition of such a thermometer element every measurement cycle. As a result, an actual observed temperature at the end of the process does not always agree with a target temperature, which often causes problems of generation of energy loss, increase of production cost, and degradation of productivity.

As a known technology of measuring a temperature in a furnace continuously, JP-A-91529/1986 (the term "JP-A-" referred to hereinafter signifies "Unexamined Japanese Patent Publication") discloses a method for measuring a temperature in a furnace using an optical fiber. In the disclosed method, however, the optical fiber is fixed at the tip of a nozzle so that the temperature measurement is carried out through a gas layer which is ejected from the tip of the nozzle. For this reason, this measuring method raises a serious problem on accuracy of the measured result. In addition, the tip of the optical fiber is exposed to an elevated temperature for a long period, which raises a problem of change of characteristics with passing time.

JP-A-203716/1988 discloses another method of continuous measurement of a molten steel. The method relates to a control method of making the molten steel by blowing in which the temperature of molten steel is continuously measured so as to agree during and at the end of blowing stage with the target value, and in which the composition at the end point is estimated from the change rate of the temperature increase. The patent specification describes "a method for measuring a temperature of a molten steel is applicable to using a radiation thermometer connecting an optical fiber, which thermometer immerses the optical fiber into the molten steel in a reaction vessel such as a converter through its bottom wall, side wall, or top cover". Nevertheless, in the specification no concrete description is given and no technological content is provided.

The inventors proposed an apparatus for measuring a temperature in the preceding Japanese Patent Application No. 78736/92 (JP-A-248960/93). The patent application described an apparatus wherein a tip of an optical fiber covered with a metallic tube is immersed into molten steel as a thermometer element, using the principle that a black body radiation condition is established at the tip of the optical fiber, and wherein the other end of the optical fiber is connected to a radiation thermometer. Also the patent application describes an apparatus for measuring a temperature in which an optical fiber feed means is installed to send out and also to retract to wind the optical fiber covered with a metallic tube and in which the tip of the optical fiber covered with a metallic tube is immersed into the molten steel for a short period only during the time for measuring the temperature thereof and is taken out from the molten steel immediately after completing the temperature measurement and in which the tip once used as the thermometer element is cut off to discard, and a new tip is fed at next measuring cycle.

The apparatus for measuring a temperature disclosed in Japanese Patent Application No. 78736/92 (JP-A-248960/93) is, however, a mere intermittent measuring apparatus, and the apparatus requires that the used tip be cut off every measurement cycle. As a result, there is a problem in that that type of apparatus fails to perform a continuous measurement for a long period.

SUMMARY OF THE INVENTION

An object of the present invention is to provide an apparatus for measuring a temperature of a high temperature liquid using an optical fiber and a method therefor which allow a continuous and long period measurement with a quick response and an accurate measurement.

To attain the object, the present invention provides an apparatus for measuring a temperature using an optical fiber, which comprises:

an optical fiber covered with a metallic tube;

a nozzle used for temperature measurement installed in a furnace containing a high temperature liquid, an end of the nozzle contacting the liquid and the metal-covered optical fiber being inserted through another end of the nozzle;

gas supply means for supplying gas into an inside of the nozzle to prevent the nozzle from clogging;

optical fiber feed means for sending an end of the metal-covered optical fiber into the liquid through the nozzle, an optical spectral light radiated from the liquid entering from another end of the metal-cover optical fiber; and a radiation thermometer for determining a temperature of the liquid from the optical spectral light transferred into the inside of the metal-covered optical fiber, the radiation thermometer being connected to the other end of the metal-covered optical fiber.

Further, there is provided a method for measuring a temperature using an optical fiber, which comprises the steps of:

preparing an optical fiber covered with a metallic tube;

sending out the metal-covered optical fiber into a high temperature liquid through a nozzle used for temperature measurement installed in a furnace containing the liquid, an end of the nozzle contacting the liquid in the furnace and an spectral light radiated from the liquid entering through an end of the metal-covered optical fiber;

supplying gas into an inside of the nozzle to prevent the nozzle from clogging and;

determining a temperature of the liquid from the spectral light transferred into an inside of the metal-covered optical fiber by means of a radiation thermometer connected to another end of the metal-covered optical fiber.

DESCRIPTION OF THE EMBODIMENT

Embodiment-1

Figure 1:
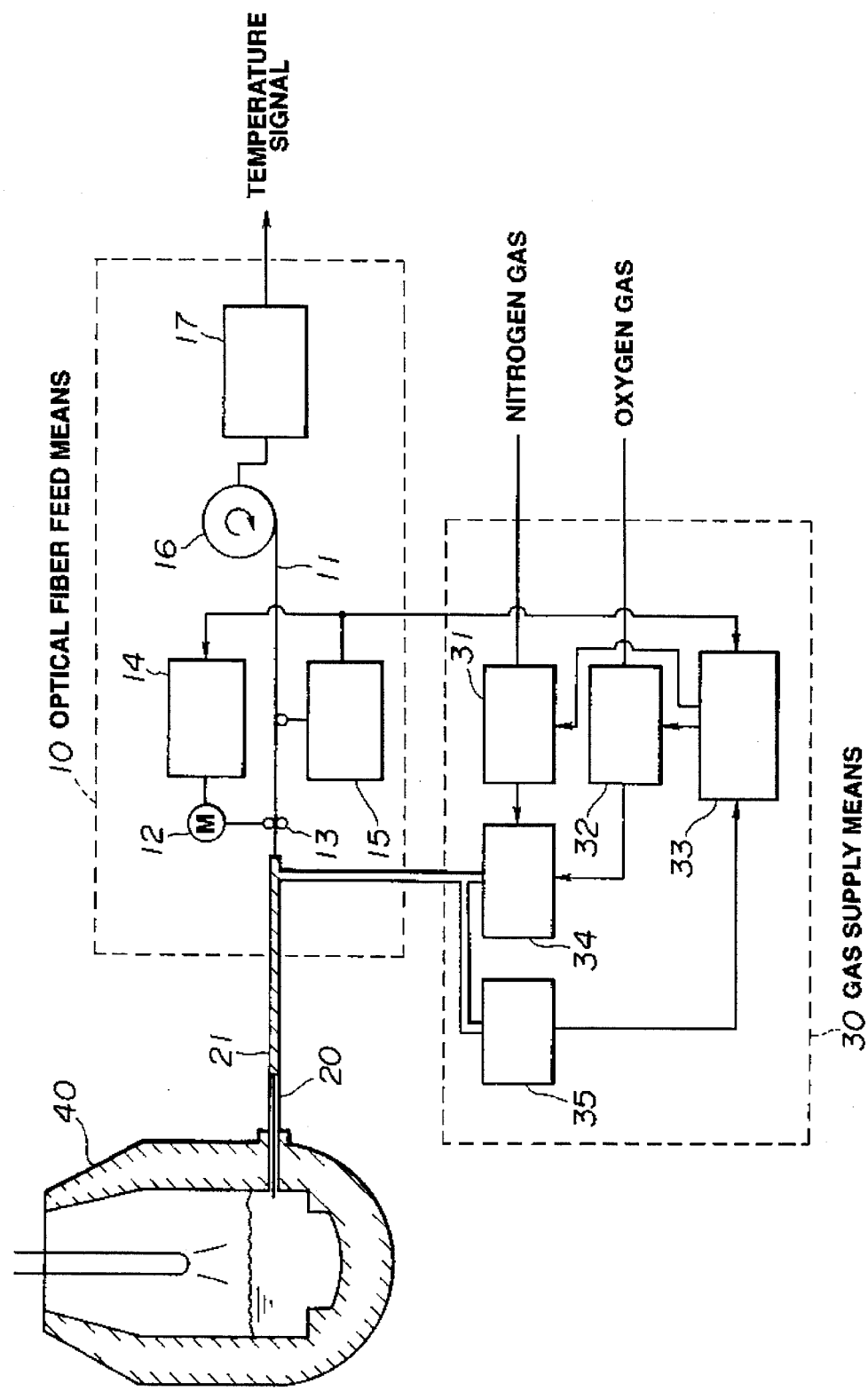
FIG. 1 is a block diagram illustrating an apparatus for measuring a temperature using an optical fiber of Example-1 of the present invention.

In the present invention, an optical fiber covered with a metallic tube is used. A nozzle for measuring a temperature of a high temperature liquid is installed on a wall of a furnace which contains the high temperature liquid. An end of the nozzle contacts the high temperature liquid while the metal-covered optical fiber is inserted from another end of the nozzle. Gas is supplied into the nozzle by gas supply means for supplying gas to prevent the nozzle from clogging. The gas is blown into the liquid in the furnace, passing through a spacious gap between the nozzle and the metal-covered optical fiber. An end of the metal-covered optical fiber is sent out to the inside of the liquid by optical fiber feed means for sending out the metal-covered optical fiber. A spectral light enters from an end of the metal-covered optical fiber. Another end of the metal-covered optical fiber is connected to a radiation thermometer and a temperature of the high temperature liquid is determined from the spectral light transferred into an inside of the metal-covered optical fiber.

The optical fiber feed means comprises a drum in which the metal-covered optical fiber is coiled in advance, a roller for sending out the metal-covered optical fiber, a motor for driving the roller, feed speed detecting means for detecting a feed speed of sending out the metal-covered optical fiber and feed speed control means for controlling the feed speed. The motor is driven, the roller seed and then, the metal-covered optical fiber is sent out. The feed speed is detected by a detector which is the detecting means. The feed speed is controlled by the feed speed controller based on a feed speed signal outputted from the detector.

The metal-covered optical fiber is inserted into the nozzle for temperature measurement and gas is blown into an inside of the high temperature liquid, passing through a spacious gap between the nozzle and the metal-covered optical fiber. Therefore, a ratio of an inside diameter of the nozzle to an outside of the metal-covered optical fiber ranges preferably from 1.5 to 3.5.

The nozzle for temperature measurement can be one selected from the group consisting of a nozzle made of brick or ceramics, a nozzle made of a single metalic tube and a nozzle made of a single metallic tube lined with ceramics inside a surface thereof. And further, the temperature measurement nozzle can be of a double-tube structure comprising an inner tube and an outer tube. The metal-covered optical fiber is inserted into the inner tube of the nozzle and gas is supplied through a spacious gap between the inner tube and the outer tube by gas supply means to prevent the nozzle from clogging.

The gas supply means comprises gas selection means for selecting a kind of gas and gas velocity control means for controlling a velocity of gas. Further, the gas supply means has pressure detecting means.

The gas selection means selects a kind of gas dependent on a degree of difficulty in sending out the metal-covered optical fiber by the optical fiber feed means. The gas velocity control means controls the gas which is blown out to have a linear velocity within a range of 50 to 500 Nm/sec at a tip of the nozzle where the nozzle contacts the high temperature liquid. The gas used for preventing the nozzle from clogging can be any one selected from the group consisting of an inert gas, a mixed gas of an inert gas and an oxidating gas and an oxidating gas.

The pressure detecting means detects a pressure of the gas which is supplied into the temperature measurement nozzle to prevent the nozzle from clogging. The gas selection means can also select a kind of gas which is supplied into the nozzle in response to a pressure signal outputted from the pressure detecting means and a feed speed signal outputted from the feed speed detecting means.

Gas is supplied into the nozzle for temperature measurement by the gas supply means to prevent the nozzle from clogging. In respect of the gas supply, it is preferable to control a flow rate of the gas supply. In case of an inert gas being supplied, mushroom is formed at a tip end of the nozzle if the flow speed is too large. The mushroom is a spongy lump which a molten metal is partially solidified to form. Owing to the formation of mushroom, the metal-covered optical fiber fails to be inserted. It can be a way of solving the formation of the mushroom to melt the mushroom by oxygen blowing and to send out the metal-covered optical fiber. In this way of blowing the oxygen, however, the melt-loss of the nozzle is a problem not to neglect. And furthermore, reaction of metal oxidation takes place at the vicinity of an outlet of the nozzle, and the accuracy of the measurment is degraded.

Regarding the mushroom, it is found that the mushroom is not formed when relation among temperature of the gas, kind of the gas, flow rate of the gas and composition of the molten metal satisfies an equation (1) given below. Therefore, the temperature measurement can be continuously performed by controlling the flow rate of the gas to be within the scope of the equation (1) while the formation of the mushroom is being prevented. Thanks to this way of doing, the oxygen blowing is not needed and therefore, the melt-loss and the degradation of the accuracy of the measurement are also prevented.

$$\{Q \cdot M \cdot C_p \cdot (T_m - T_g)\}/(T_m - T_l) < 4.0 \times 10^7 \quad (1)$$

where

Q: gas flow rate to be blown (Nl/min)

Tm: temperature of molten metal (K)

Tl: solidification temperature of molten metal (K)

Tg: temperature of gas to be blown (K)

Cp: specific heat of gas at temperature of molten metal (J/Kg·K)

M: molecular weight of gas to be blown.

EXAMPLE

Example-1

FIG. 1 illustrates a block diagram showing an apparatus for measuring a temperature using an optical fiber of Example-1 of the present invention. In the figure, the reference numeral 10 denotes optical fiber feed means which comprises an optical fiber 11 covered with metallic tube, a motor 12, a roller 13, feed control means 14, feed speed detecting means 15, an optical fiber drum 16, and a radiation thermometer 17. The reference numeral 20 denotes a nozzle used for temperature measurement to insert the metal-covered optical fiber 11 into a furnace, and the nozzle is also called a temperature measuring tuyere. The reference numeral 21 denotes an optical fiber guide which connects with the nozzle 20, through which the metal-covered optical fiber 11 is passed and gas for preventing the nozzle from clogging up is supplied. The reference numeral 30 denotes gas supply means for supplying gas which prevents the nozzle from clogging, which comprises two gas pressure/flow rate regulators 31 and 32, a supply gas controller 33, a supply gas generator 34, and a gas pressure detector 35. The reference numeral 40 denotes a furnace such as a converter or an electric furnace. The example shown in the figure illustrates the nozzle 20 used in measuring a temperature mounted at a side wall of the furnace 40. Nevertheless, the nozzle 20 can be mounted at a bottom of the furnace 40.

The apparatus for measuring a temperature of the present example using an optical fiber enables to carry out a continuous temperature measurement of a high temperature liquid, for example, molten metal in a furnace, by directly immersing a tip of the metal-covered optical fiber 11 into a molten metal or slag in the furnace together with a gas for preventing the nozzle clogging (nitrogen gas, for example), and by continuously feeding a fresh portion of the metal-covered optical fiber to supply a new tip of the metal-covered optical fiber 11 to make up the melted out tip of the metal-covered optical fiber. The reason why the optical fiber is covered with a metallic tube is to secure a strength for enduring a pressure of gas for preventing the nozzle from clogging due to the pressure imposed on the optical fiber during a feeding period of the optical fiber into the furnace using the optical fiber feed means 10 and also to protect the optical fiber inside of the metallic tube. The metallic tube covering the optical fiber is, for example, a stainless steel tube. Since a melting point of stainless steel ranges about from 1400° to 1430° C., the metallic tube does not melt immediately after immersed into a high temperature molten steel and protects the optical fiber for several seconds. Also since Example-1 uses a quartz glass having a softening point of 1600° C. or more as the optical fiber, the optical fiber can maintain its original shape for a short time. In the present example the metal-covered optical fiber 11 having 1.2 mm in outside diameter was employed.

The temperature measurement nozzle 20 can be made of brick or ceramics, a single metallic tube, or a single metallic tube with ceramics lined inside thereof. Another example of the nozzle has a double-tube structure in which the temperature measuring tube made of a single metallic tube or a single metallic nozzle with ceramics lined inside thereof is surrounded by a concentric metallic tube, and a spacious gap formed between the outside diameter of the inner nozzle and the inside diameter of the outer metallic tube is connected to the gas supply means 30 which supplies gas to prevent the nozzle's clogging.

The temperature measurement nozzle 20 contacts the high temperature liquid at an end thereof, and connects to an optical fiber guide 21 on another end in air-tight sealing. The metal-covered optical fiber 11 is inserted through the nozzle 20 from the side of the optical fiber guide 21 and is immersed into the high temperature liquid. A spacious gap is provided between the inside diameter of the nozzle 20 and the outside diameter of the metal-covered optical fiber 11, and the preventive gas against the nozzle's clogging is supplied into the spacious gap via the optical fiber guide 21.

Figure 2:
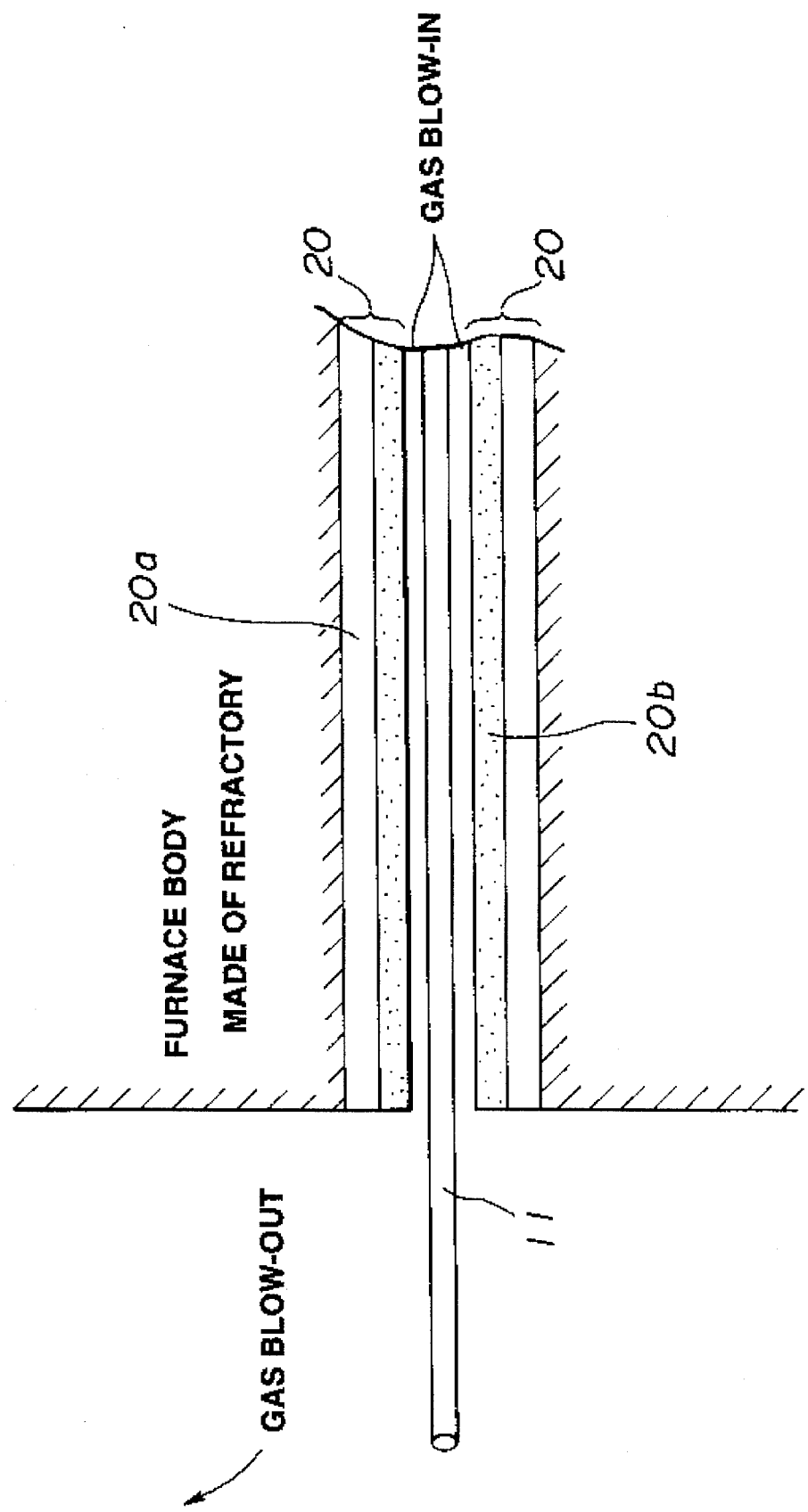
FIG. 2 is a longitudinal and sectional view illustrating an example of a nozzle used for measuring a temperature which comprises a single metallic tube lined with ceramics inside surface of the nozzle of the present invention.

FIG. 2 illustrates an example of the nozzle 20 for temperature measurement, which comprises a single metallic tube lined with ceramics inside surface thereof. The nozzle 20 is structured with a stainless tube 20a having a ceramic tube 20b inside the stainless tube. The example uses SUS 304 as the stainless steel tube 20a and silicon nitride ($Si_3N_4$) as the ceramic tube 20b. Nevertheless, the ceramic is not necessarily limited to silicon nitride, and boron nitride (BN), zirconium oxide ($ZrO_2$) and other ceramics can be applied. Instead of the ceramic tube, a metallic tube lined with ceramics inside thereof can be also applied.

The reason why the stainless steel tube 20a is accompanied with the inner ceramic tube 20b is described below. When the temperature measurement nozzle 20 is structured only by the stainless tube 20a, there may occur a fusion of the covering tube (stainless tube) of the optical fiber with the nozzle 20 to stop the feed of the metal-covered optical fiber 11 and to stop the continuous measurement temperature. To avoid such an accident, the ceramic tube 20b is placed inside. The configuration prevents the fusion of the nozzle 20 with the protective tube of the optical fiber.

The temperature measurement nozzle 20 which was structured by the stainless steel tube 20a and the ceramic tube 20b shown in FIG. 2, had an inside diameter of 4.0 mm, an outside diameter of 8.0 mm, and a length of approximately 1000 mm. In the case of a single nozzle of a stainless steel tube (for example, above-described SUS 304), the tube had an approximate size of 2.0 mm in inside diameter and 4.0 mm in ouside diameter.

The optical fiber guide 21 has a function to send out the metal-covered optical fiber 11 continuously from the optical fiber feed means 10 to the molten metal in the furnace 40 via the nozzle 20 together with the gas which is supplied by the gas supply means 30 to prevent the nozzle's clogging.

An end of the optical fiber guide 21 connects with the nozzle 20 at an end which does not contact the high temperature liquid in an air-tight sealing. Another end of the optical fiber guide 21 has a highly air-tight structure with double seal, for example, in a way that the metal-covered optical fiber 11 is allowed to pass through the the optical fiber guide while the preventive gas agaist the nozzle's clogging is not leaked to the side of the optical fiber feed means 10. The spacious gap 20d formed between the inside diameter of the optical fiber guide 21 and the outside diameter of the metal covered optical fiber 11 is connected to a pipe coming from the gas supply means 30 to prevent the nozzle's clogging so as to receive the gas.

In this manner, the optical fiber guide 21 comprises a component other than that of the temperature measurement nozzle 20. Nevertheless, the function for feeding the optical fiber into the furnace 40 together with the preventive gas against the nozzle clogging is common in the nozzle 20 and the optical fiber guide 21 so that the optical fiber guide 21 can be said as a part of the nozzle 20 in a broad sense.

Through the nozzle 20 which is connected air-tightly to the optical fiber guide 21 the preventive gas is blown in the molten metal in the furnace 40 together with sending out the metal-covered optical fiber 11.

In this case, during the blow-in of the gas, bubbles are formed within a region where the preventive gas rises in the molten metal. If the tip of the metal-covered optical fiber 11 enters in the bubble forming region, then the accuracy of temperature measurement is degraded. Therefore, it is preferred to position the nozzle 20 with a downward inclined angle (about 30 degree, for example) with regard to a horizontal plane, for example so that the tip of the metal-covered optical fiber 11 is prevented from entering into the gas bubble rising region.

The optical fiber feed means 10 functions to send the metal-covered optical fiber 11 continuously or intermittently into the furnace 40 through the optical fiber guide 21 and the temperature measurement nozzle 20. To do this, the feed controller 14 drives the motor 12 and feeds the metal-covered optical fiber 11 which is coiled in the optical fiber drum 16 in advance. At the feeding stage, the speed detector 15 detects the feed speed of the optical fiber, and the feed speed is controlled based on the detected value to become the predetermined value.

In the present example, the continuous feed speed of the metal-covered optical fiber was set to 5 mm/sec, and the intermittent feed speed was set to the repeated cycle comprising 10 mm/sec for 10 second feed and 20 seconds of non-feeding time. Since the tip of the metal-covered optical fiber 11, which is fed into the furnace together with the gas supply for preventing the nozzle clogging, is melted and consumed, the length of melt-loss (the consumed length) is supplied continuously with a new optical fiber by the continuous feed of the optical fiber. The continuous supply of the optical fiber allows the continuous temperature measurement.

The feed speed detector 15 can determine a feed speed based on a rotational angle of a roller for sensor within a unit time, for example. The detected signal is supplied to the feed controller 14 and the feed gas controller 33 in the gas supply means 30 so as to preventing the nozzle from clogging.

The degree of difficulty of sending out the optical fiber is judged by identifying whether the detected value on the feed speed detector 15 is in a normal range or not. For example, as the tip of nozzle 20 advances clogging, the feed speed decreases. When the feed speed becomes below the normal range, the feed controller 4 stops the drive of the motor 12 to prevent a possible damage of the gas supply means.

The present invention uses a principle of measurement in which, if a black body radiation condition is established, an absolute temperature is computed from the radiation spectral distribution. To carry out the procedure, the spectral light radiated from the molten metal is received from the tip of the metal-covered optical fiber 11, and the entered spectral light is propagated through the optical fiber to enter the radiation thermometer 17.

As the radiation thermometer 17, for example, there are a two-color thermometer which determines temperature by comparing luminance output of two kinds of wavelength and an infrared radiation thermometer which directly determines temperature from luminance output of a radiation light. Those thermometers calculate a temperature from the entered light spectral signal following their own measuring method, and the calculated temperature signal is generated as an electric signal, which is then sent to, for example, a recorder which is not shown in the figure.

The gas supplied to the optical fiber guide 21 by the gas supply means 30 is selected from the group consisting of an inert gas (nitrogen was used in the present example), an oxidizing gas (oxygen was used in the present example), and a mixed gas of an inert gas and an oxygen gas (the mixed ratio is variable). The selection of the gas is conducted automatically or manually in response to a degree of difficulty or easiness of sending out the metal-covered optical fiber 11 by the optical fiber feed device 10. The example shown in FIG. 1 used an automatic selection of the gas.

The supply gas controller 33 in the gas supply device 30 receives a pressure signal detected-by the gas pressure detector 35 and receives a feed speed signal detected by the feed speed detector 15 in the optical fiber feed device 10. The supply gas controller 33 automatically selects either one of the three types of gas which prevents the nozzle from clogging in response to two kinds of the detected signals, and supplies the control signal prepared based on the results of the selection to the pressure/flow rate regulators 31 and 32.

The pressure/flow rate regulators 31 and 32 contain pressure regulators, flow rate regulators, control valves, etc. Each of those included in the pressure/flow rate controllers supplies nitrogen gas and oxygen gas at a pressure and flow rate following the control signal to the supply gas generator 34. In the supply gas generator 34, either one of nitrogen, oxygen, or their mixed gas is generated at a specified pressure, from which the gas is supplied to the optical fiber guide 21.

The gas pressure detector 35 detects the pressure of gas fed by the supply gas generator 34 to the optical fiber guide 21 and supplies the detected value to the supply gas controller 33. The action allows to judge the state of clogging at the tip of the temperature measurement nozzle 20 by checking the detected value whether it is in a normal range or not, by utilizing the phenomenon that, as the tip of the nozzle 20 becomes clogging, the blowing gas volume decreases and the detected value of gas pressure increases. The supply gas controller 33 judges the clogging state at the tip of the nozzle 20 based on the supply gas pressure detected value and the optical fiber feed speed detected value, and conducts an automatic selection of gas.

In the example of FIG. 1, when the detected value of optical fiber feed speed and the detected value of supply gas pressure are in a normal range, the supply gas controller 33 selects an inert gas (nitrogen gas in FIG. 1) having the cooling effect as a gas which prevents the nozzle from clogging so as to protect the metal-covered optical fiber 11 inserted into the nozzle 20 and the furnace 40. However, if the quantity of the inert gas flow rate is too large, mushroom (spongy lump formed by partially solidified molten metal) appears at the tip of the nozzle 20, and further insertion of the metal-covered optical fiber 11 is prevented. On the contrary, if the quantity of the inert gas flow rate is too small, the molten metal enters into the tip of nozzle 20.

According to the example of FIG. 1, the quantity of blown nitrogen gas which was adjusted by the pressure/flow rate regulator 31 and which is sent to the optical fiber guide 21 is 5.0 Nm$^3$/hr (1389 cc/sec), and the linear velocity of the gas at the tip of the nozzle 20 is regulated to have an adequate value within the range of from 50 to 500 Nm/sec. To secure the specified linear velocity, it is most preferable to keep the range of the ratio of the inside diameter of the nozzle 20 to the outside diameter of the metal-covered optical fiber 11 approximately from 1.5 to 3.5.

Even if the temperature measurement is conducted while blowing nitrogen gas as described above, the feed speed of the optical fiber may reduce and the supply gas pressure may increase resulted from the growth of mushroom at the tip of the nozzle 20 in the furnace 40. In that case, the supply gas controller 33 selects a mixed gas of nitrogen and oxygen at an adequate ratio as the gas which prevents the nozzle from clogging. The mixing ratio of each gas component is variable, but it is preferable to set the oxygen content at maximum 50% from the standpoint of protection of the nozzle 20.

The supply gas controller 33 controls the pressure/flow rate regulators 31 and 32 based on the aforedescribed selected results, generates a mixed gas having the mixing ratio specified above, blows the selected mixed gas in the optical fiber guide 21, melts mushroom and the like, and prevents the adhesion of the mushroom. However, there are some cases that a firm adhesion of mushroom prevents the recovery of the feed speed of the optical fiber and the feed gas pressure to a normal range even under the blowing of the mixed gas. In these cases, the supply gas controller 33 selects oxygen gas as the gas for preventing the nozzle from clogging for a short period, and makes the oxygen gas melt the mushroom.

Figure 3:
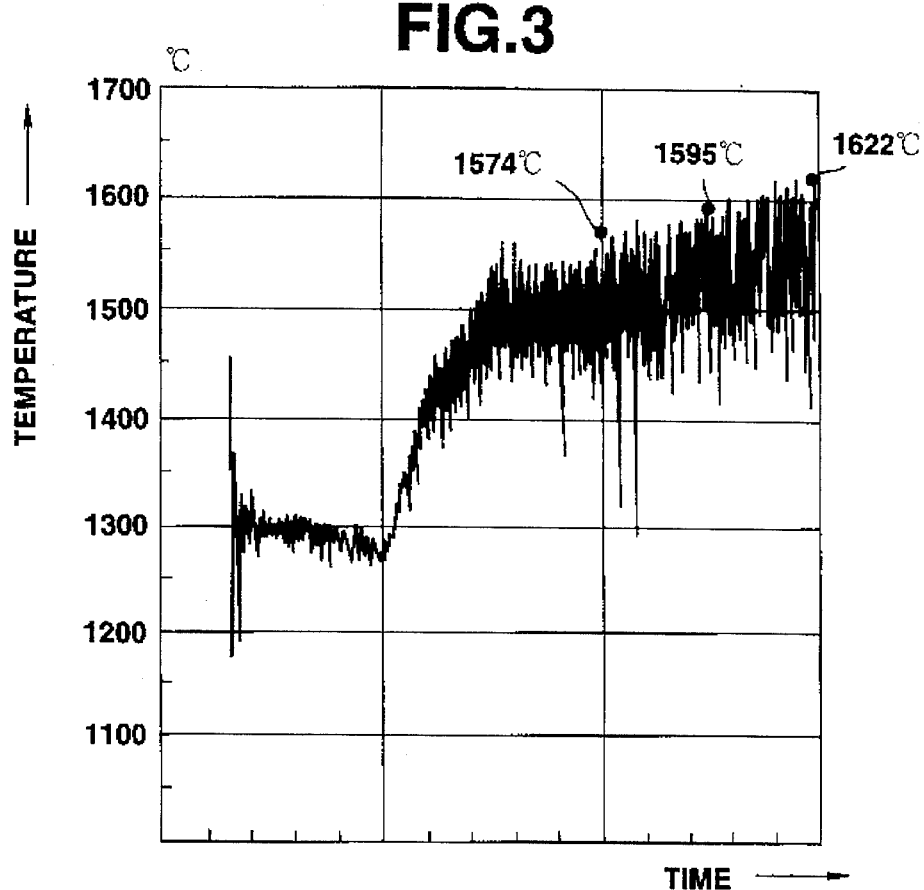
FIG. 3 is a graphic representation showing temperature measurement results according to Example-1 of the present invention.

FIG. 3 shows results of the temperature measurement in a converter using an optical fiber under the condition given below.

(1) Nozzle for Temperature Measurement

Type: combined single tube nozzle

Inside/outside diameter of the nozzle: 4.0 mm/8.0 mm

Material: SUS 304+Si$_3$N$_4$ (2) Optical Fiber

Structure: covered with stainless steel tube

Outside diameter: 1.2 mm (3) Gas Blowing

Kind of gas: nitrogen

Rate of blowing: 5.0 Nm$^3$/hr

Speed of blowing: 121 Nm/sec (4) Optical Fiber Feeed Speed: 5 mm/sec (continuous) or 10 mm/sec (intermittent).

The waveform varying in vertical direction in FIG. 3 indicates the temperature measured by the optical fiber, and the solid circles indicate the temperature determined by a thermocouple during intermittent sublance measurement for confirming the accuracy. The difference between a peak value measured by the optical fiber and a measured value using the thermocouple was 4° C. at an average. The error of 4° C. for the measured temperature at 1600° C. corresponded to the accuracy of 0.25%, which was a considerably high accuracy.

For the cases between the optical fiber feed speed of 5 mm/sec in continuous mode and the feed speed at 10 mm/sec for 10 seconds followed by 20 seconds of non-feeding period in intermittent mode, nearly the same results were obtained. In addition, the supply of a mixed gas of nitrogen and oxygen was carried out at need, and no trouble of stopping the optical fiber insertion occurred.

Figure 4:
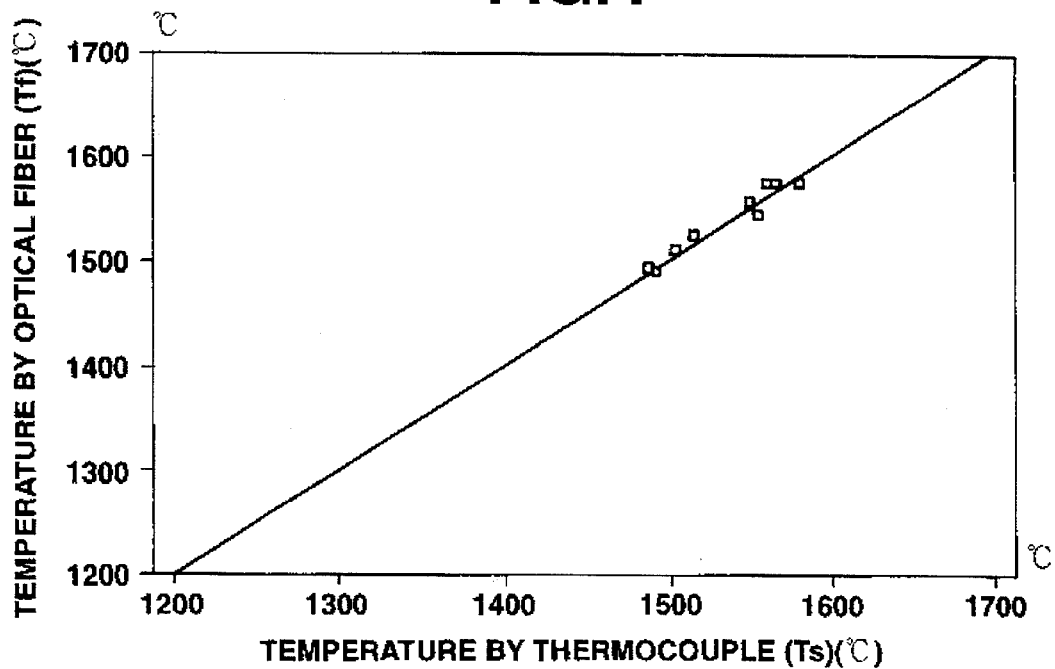
FIG. 4 is a graphic representation showing a comparison of a thermocouple indication value and an optical fiber indication value according to Example-1 of the present invention.

FIG. 4 shows the relation between a thermocouple indication value (Ts) and an optical fiber thermometer indication value (Tf) drawn on a graph of Ts as vertical axis and Tf as horizontal axis. The observed values with optical fiber are expressed by an open square symbol of "□". The open square marks in FIG. 4 disperse nearly on the straight line of Ts=Tf, which indicates that the observation was correct.

Example-2

Figure 5:
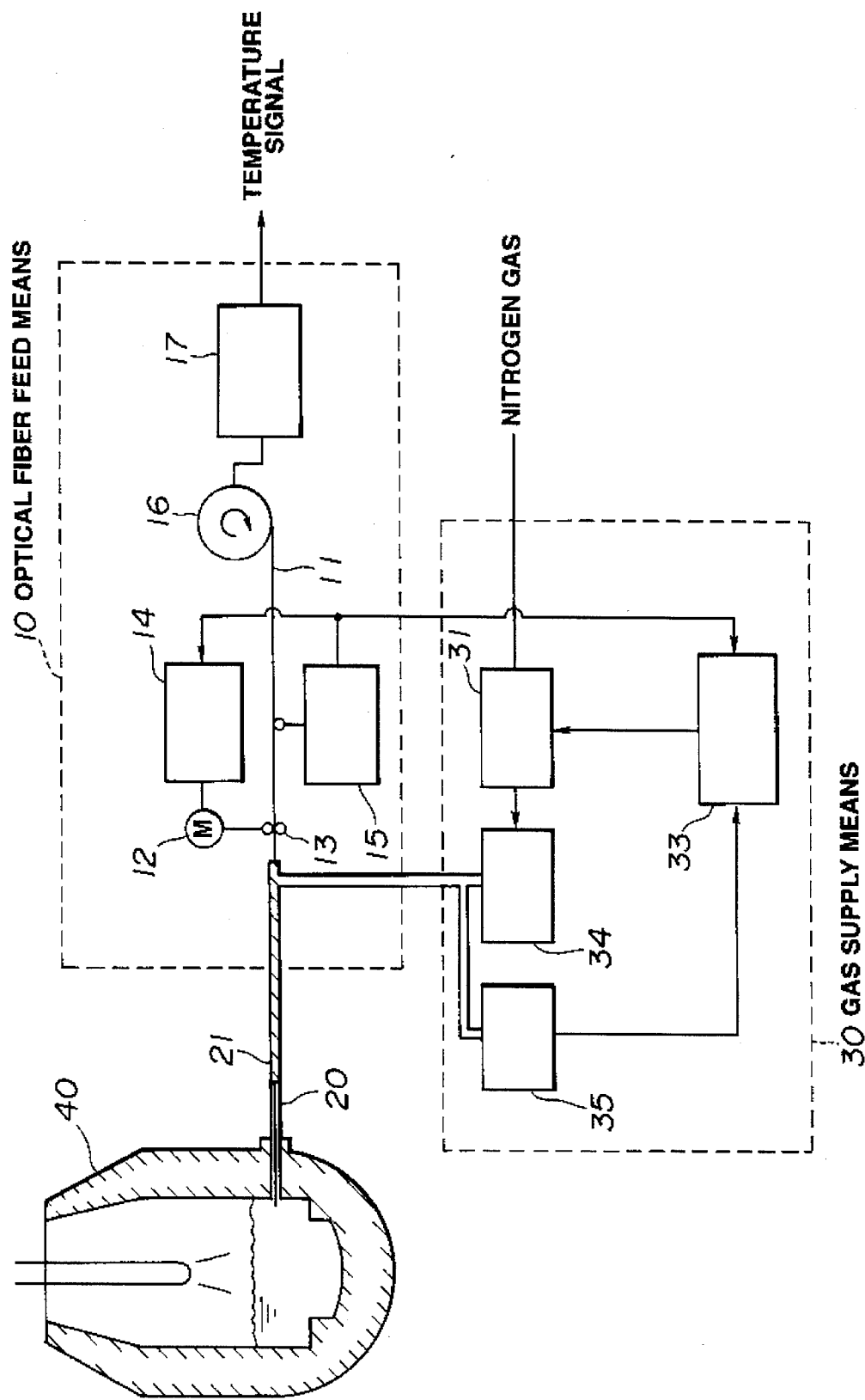
FIG. 5 is a block diagram illustrating an apparatus for measuring a temperature using an optical fiber of Example-2 of the present invention.

FIG. 5 illustrates a block diagram showing another example of an apparatus for measuring a temperature using an optical fiber of the present invention. Compared with Example-1 of FIG. 1, Example-2 omitted the pressure/flow rate regulator 32 which regulates the oxygen pressure, and no oxygen was supplied to the system. Instead, the pressure/flow rate regulator 31 adjusted the nitrogen gas flow rate to keep in a specified range.

Figure 6:
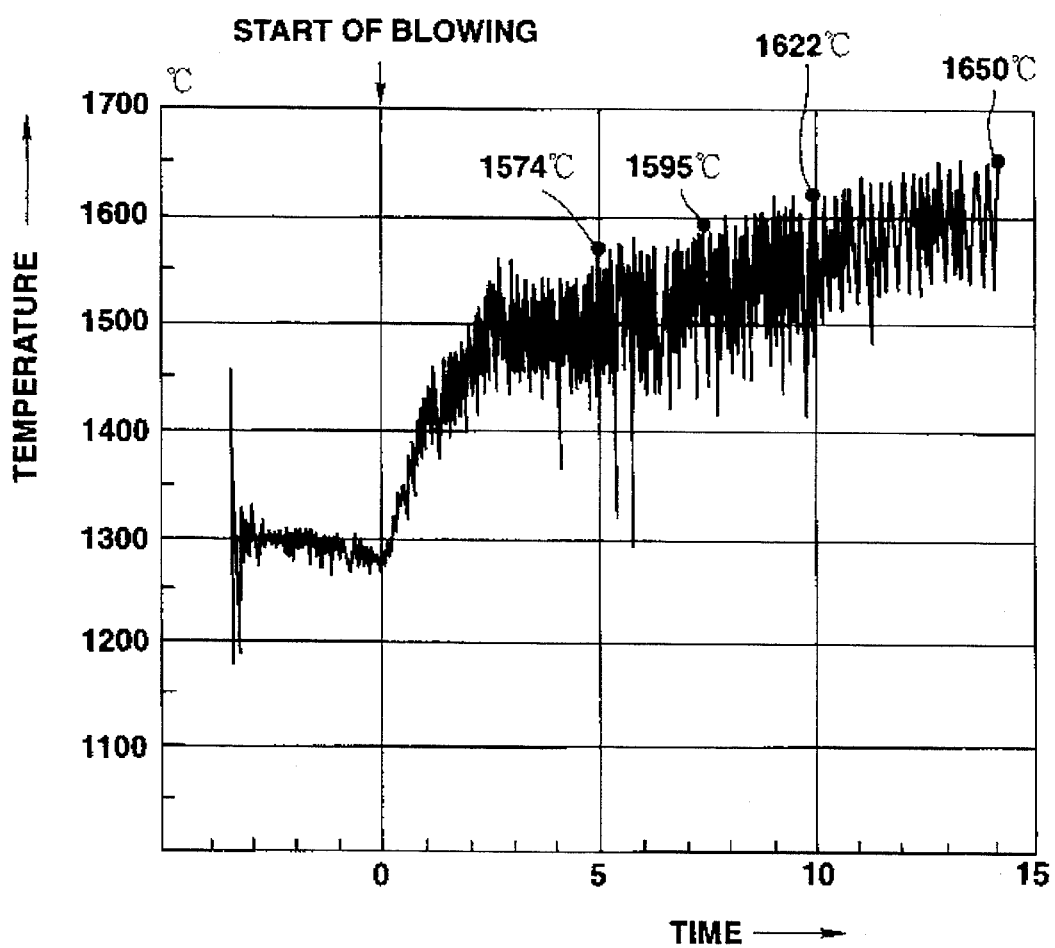
FIG. 6 is a graphic representation showing temperature measurement results according to Example-2 of the present invention.

FIG. 6 shows an example of the temperature measurement in a converter using an optical fiber under the condition given below.

(1) Nozzle for Temperature Measurement
Type: combined single tube nozzle
Inside/outside diameter of the nozzle: 3.0 mm/7.0 mm
Material: SUS 304+$Si_3N_4$
(2) Optical Fiber
Structure: covered with stainless steel tube
Outer diameter: 1.2 mm
(3) Gas Blowing
Kind of gas: nitrogen
Rate of blowing: 2 to 20.9 $Nm^3$/hr
(4) Optical Fiber Sending Speed: 5 mm/sec. (continuous) or 10 mm/sec (intermittent)
(5) Molten Metal [C]: 4.2 to 0.02%
Temperature: 1250° to 1650° C.

The waveform varying in vertical direction in FIG. 6 indicates the temperature measured by optical fiber, and the solid circles indicate the temperature determined by a thermocouple during intermittent sublance measurement for confirming the accuracy. The difference between a peak value measured by the optical fiber and a measured value using the thermocouple was 4° C. at an average. The error of 4° C. for the measured temperature at 1600° C. corresponded to the accuracy of 0.25%, which was of considerably high accuracy as observed in FIG. 3. For the cases between the optical fiber feed speed of 5 mm/sec. in continuous mode and the feed speed at 10 mm/sec. for 10 seconds followed by 20 seconds of non-feeding period in intermittent mode, nearly the same results were obtained.

Figure 7:
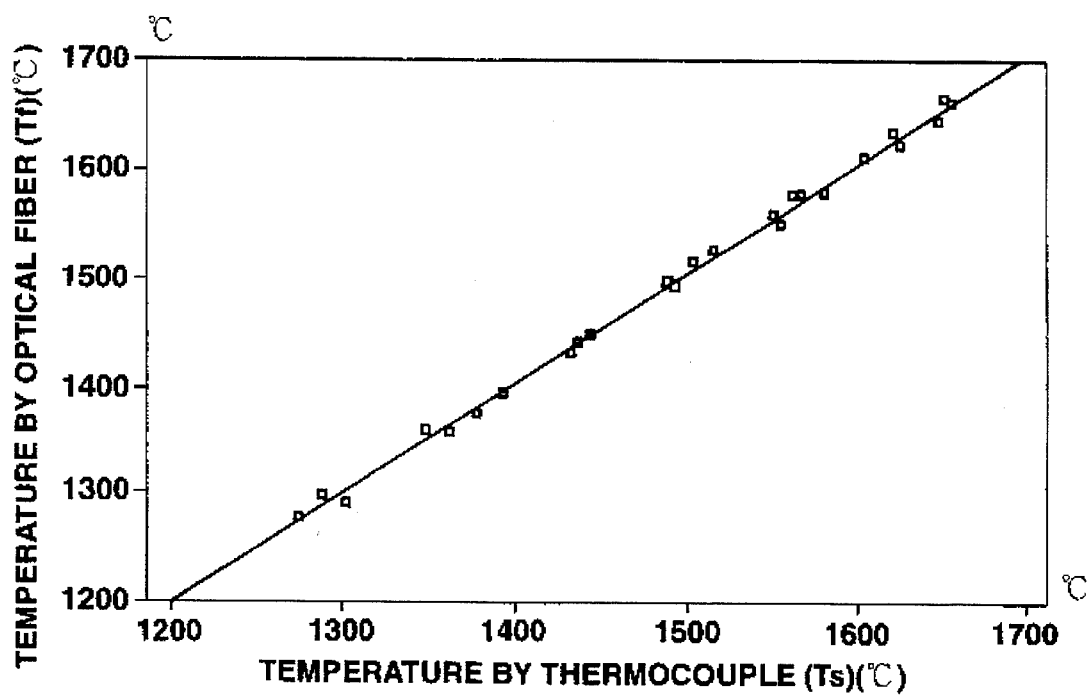
FIG. 7 is a graphic representation showing a comparison of a thermocouple indication value and an optical fiber indication value according to Example-2 of the present invention.

FIG. 7 shows the relation between a thermocouple indication value (Ts) and an optical fiber thermometer indication value (Tf) drawn on a graph of Ts as vertical axis and Tf as horizontal axis. The observed values with optical fiber are expressed by open square symbol of "☐". The open square marks in FIG. 4 dispersed nearly on the straight line of Ts=Tf, which indicates that the observation was correct.

Figure 8:
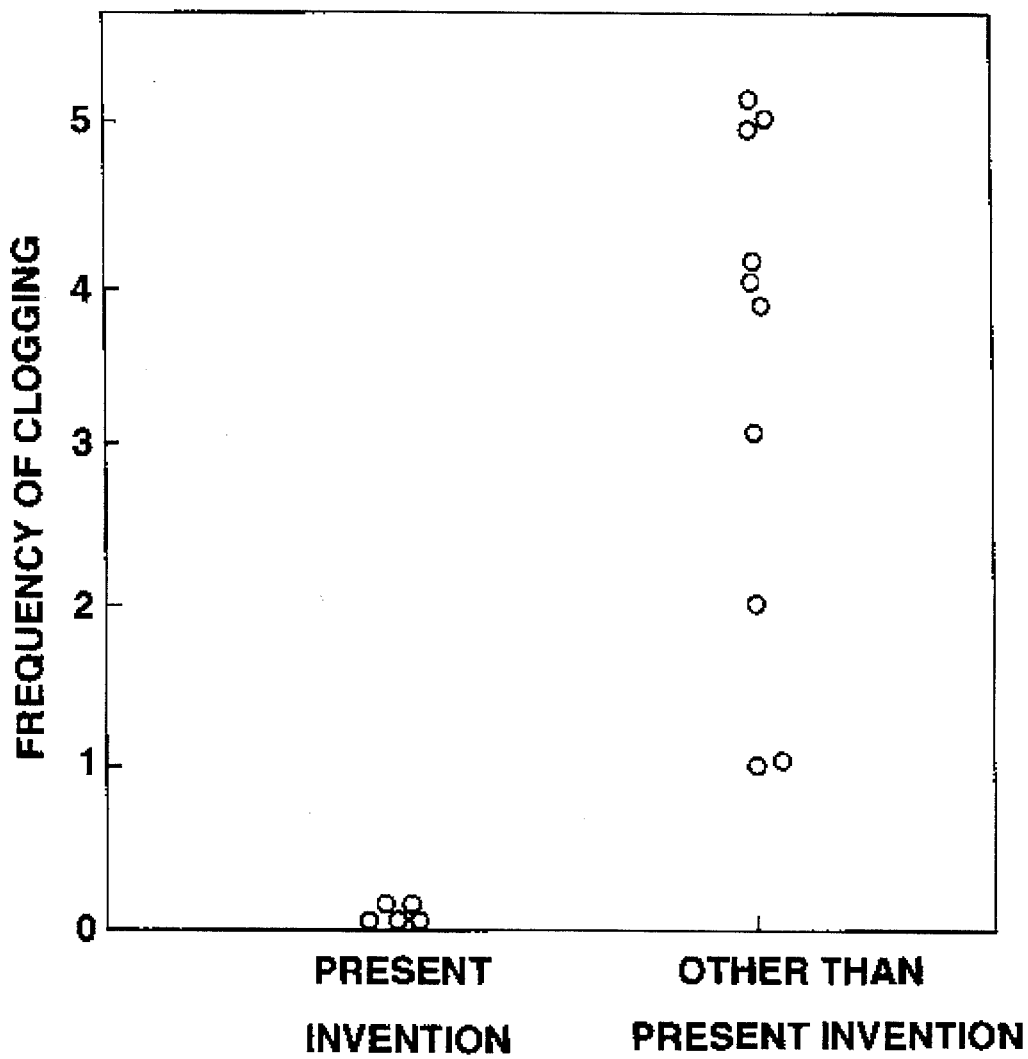
FIG. 8 graphically shows an effect in preventing a nozzle from clogging according to Example-2 of the present invention.

FIG. 8 compares the frequency of stoppage of fiber feeding between the case that the blowing gas flow rate was kept to satisfy the equation (1) and the case of other conditions (where only nitrogen gas was supplied and without following the condition of the equation (1)). The figure shows that the mode of the present invention allows a stable measurement.

According to the present invention, to measure temperature of a high temperature liquid, the tip of the optical fiber covered with metallic tube is immersed directly into the high temperature liquid through the temperature measurement nozzle together with the supply of gas which prevents the nozzle from clogging, and the length of melted loss of the tip of the optical fiber is replaced with a new tip by continuously feeding the optical fiber, which provides an apparatus for measuring a temperature using an optical fiber while giving a continuous measurement of temperature for a long period with a quick response at a high accuracy.

Also according to the invention, since the gas which prevents the nozzle from clogging is supplied by selecting either one of an inert gas having an effect of cooling, a mixed gas of inert gas and oxygen, which mixed gas has an effect for melting mushroom and the like, or oxidizing gas, the tip of the nozzle is no more clogged with mushroom or the like and the feed of optical fiber does not become difficult.

Also according to the invention, since the ratio of the inside diameter of the nozzle for temperature measurement to the ouside diameter of the optical fiber covered with metallic tube is set in a range of from 1.5 to 3.5, the gas linear velocity blown from the tip of the temperature measurement nozzle is controlled at an adequate level in a range of from 50 to 500 Nm/sec.

Also according to the invention, since a temperature measurement nozzle made of brick or ceramics or a temperature measurement nozzle made of a single metallic tube lined with ceramics inside thereof can be used, there is no possibility of accidental stoppage of optical fiber feed resulted by a fusion of the covering tube of the optical fiber with the temperature measuring tube.

Also according to the invention, since the nozzle for temperature measurement comrising a single metallic tube lined with ceramics inside thereof is further surrounded by a metallic tube to form a double-tube structure and since the gas which prevents the nozzle from clogging is blown through the gas between the inside nozzle for temperature measurement and the outside metallic tube, the durability of the temperature measurement nozzle is improved and a long period of operation of the nozzle is realized.

Also according to the invention, since either one kind of the gas among three of them is automatically selected in responce to the feed speed signal outputted from the speed detection means to detect the optical fiber feed speed and to the pressure signal outputted from the pressure detector detecting the pressure of the preventive gas, the labor saving in a long period of continuous measurement is enhanced and the automatic measurement is realized.

According to the invention, in the case of measuring a temperature of a high temperature liquid, an adequate control of the flow rate of the gas which prevents the nozzle clogging suppresses the formation of mushroom at the tip of the nozzle, so the long period of continuous temperature measurement of a high temperature liquid is available with a quick response and at a high accuracy.

Embodiment-2

According to the present invention, an end of an optical fiber covered with a metallic tube which is coiled inside of a drum in advance is sent out, passing through a temperature measurement nozzle and is immeresed into a high temperature liquid in a container continuously or intermittently. And a radiation thermometer connected to another end of the optical fiber covered with a metallic tube measures a temperature of the high temperature liquid. Into a spacious gap formed between an inside wall of the nozzle and a outside periphery of the optical fiber covered with a metallic tube, a preventive gas is supplied to prevent the clogging of the nozzle.

When the nozzle 20 uses a ceramic pipe such as alumina pipe or a refractory made of mag-carbon (MgO—C) or the like having a through-hole, the nozzle sometimes breaks owing to thermal stress and thermal impact. In that case, the molten metal enters into the nozzle and clogs the nozzle, and finally the temperature measurement becomes unable to continue. Therefore, the present invention uses a metallic tube such as a stainless steel tube as the temperature measuring tube. To prevent the nozzle's clogging, an inert gas such as argon and nitrogen is supplied to the metallic tube. During the introduction of an inert gas as the gas for preventing the nozzle's clogging, if the flow rate of the gas is excessive, then mushroom (a spongy lump formed by dispersively solidified molten metal) appears at the tip of the nozzle, and the immersion of the optical fiber covered with a metallic tube can not be performed.

A countermeasure to the generation of mushroom is to melt the formed mushroom by an oxygen blow, and to allow the feed of the optical fiber. However, the oxygen blow raises a problem of melt loss of the nozzle. Furthermore, a metal oxidation reaction occurs in the vicinity of the nozzle outlet to degrade the accuracy of measurement.

Accordingly, a less flow rate of the gas which prevents the nozzle's clogging is preferable, but an excessively short flow rate of the gas induces the melting of metallic tube surrounding the nozzle which results in a fusion of the metallic tube with the optical fiber covered with a metallic tube. The fusion also makes the temperature measurement impossible.

After a series of experiments on the melt-out of the tip of the nozzle during feeding of the optical fiber using the nozzle covered with a metallic tube, the inventors found that, when the relation among temperature of gas, kind of gas, flow rate of gas, temperature of molten metal, composition of molten metel, and nozzle diameter satisfies an equation (2), the optical fiber can be supplied continuously and stably without melting the tip of the nozzle. Consequently, under a state of regulating gas flow rate in a range specified by the equation (2), a continuous temperature measurement is stably secured for a long period while preventing the melt of the metallic tube (nozzle for temperature measurement).

$$\{Q \cdot M \cdot Cp \, (Tm-Tg)\}/(Tm-Tl) > 3.0 \times 10^6 \qquad (2)$$

where

Q: gas flow rate to be blown (Nl/min)

Tm: temperature of molten metal (K)

Tl: solidification temperature of molten metal (K)

Tg: temperature of gas to be blown (K)

Cp: specific heat of gas to be blown at temperature of molten metal (J/Kg·K)

M: molecular weight of gas to be blown.

Furthermore, it is more preferable that the relation among temperature of gas, kind of gas, flow rate of gas, temperature of molten metal, composition of molten metel, and nozzle diameter satisfies at the same time the equation (1) and the equation (2) mentioned herein-before. Under the state of regulating gas flow rate in the range thus specified by the equations (1) and (2), the continuous temperature measurement is stably secured more preferrably for a long period while preventing the melt of the metallic tube.

Example-3

Temperature measurement is performed using an apparatus for measuring a tempertaure of a high temperature liquid shown in FIG. 5 illustrating Example-2 of the present invention. When the temperature measurement is carried out, a clogging state of the temperature measurement nozzle 20 is judged based on a detected pressure value of the blown gas and a detected feed value of the optical fiber. And the gas flow rate is controlled by a supply gas controller 33. For the control, the supply gas controller 33 sends a control signal to a pressure/flow ratw regulator 31 so as to satisfy the equation (2).

Figure 9:
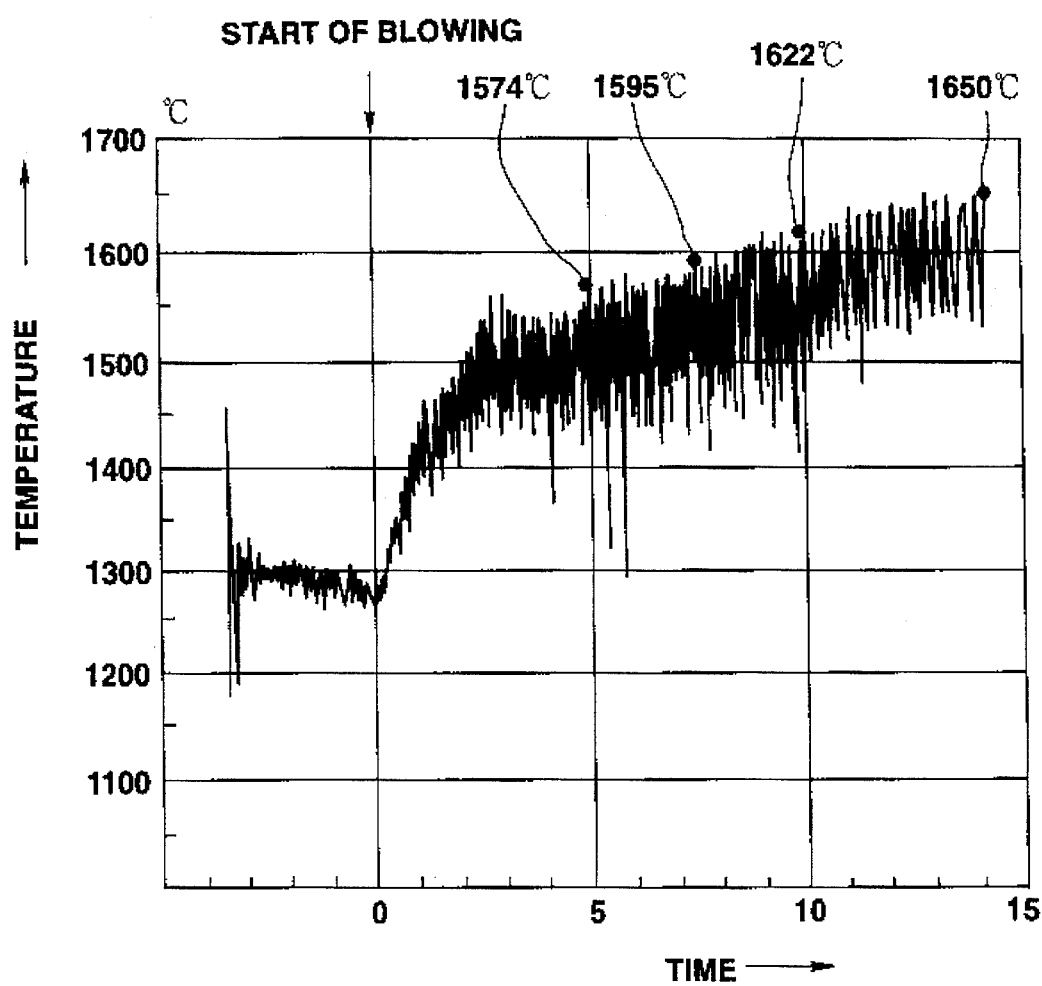
FIG. 9 is a graphic representation showing temperature measurement results according to Example-3 of the present invention.

FIG. 9 shows results of the temperature measurement in a converter using an optical fiber according to Example-3 of the present invention under the condition given below.

(1) Nozzle for Temperature Measurement

Type: metal single tube nozzle

Inside/outside diameter of nozzle: 2.0 mm/4.0 mm

Material: SUS 304

(2) Optical Fiber

Structure: covered with stainless steel tube

Ouside diameter: 1.2 mm (3) Gas Blowing

Kind of gas: argon

Temperature: room temperature

Rate of blowing: 0.5 to 5.0 Nm$^3$/hr (4) Optical Fiber Feed Speed: 5 mm/sec (continuous) or 10 mm/sec (intermittent)

(5) Molten Metal [C]: 4.2 to 0.02%

Temperature: 1250° to 1650° C.

The waveform varying in vertical direction in FIG. 9 indicates the temperature measured by optical fiber, and the solid circles indicate the temperature determined by a thermocouple during intermittent sublance measurement for confirming the accuracy. The difference between a peak value measured by the optical fiber and a measured value using the thermocouple was 4° C. at an average. The error of 4° C. for the measured temperature at 1600° C. corresponded to the accuracy of 0.25%, which was of a considerably high accuracy. For the cases between the optical fiber feed speed of 5 mm/sec in continuous mode and the feed speed at 10 mm/sec for 10 seconds followed by 20 seconds of non-feeding period in intermittent mode, nearly the same results were obtained.

Figure 10:
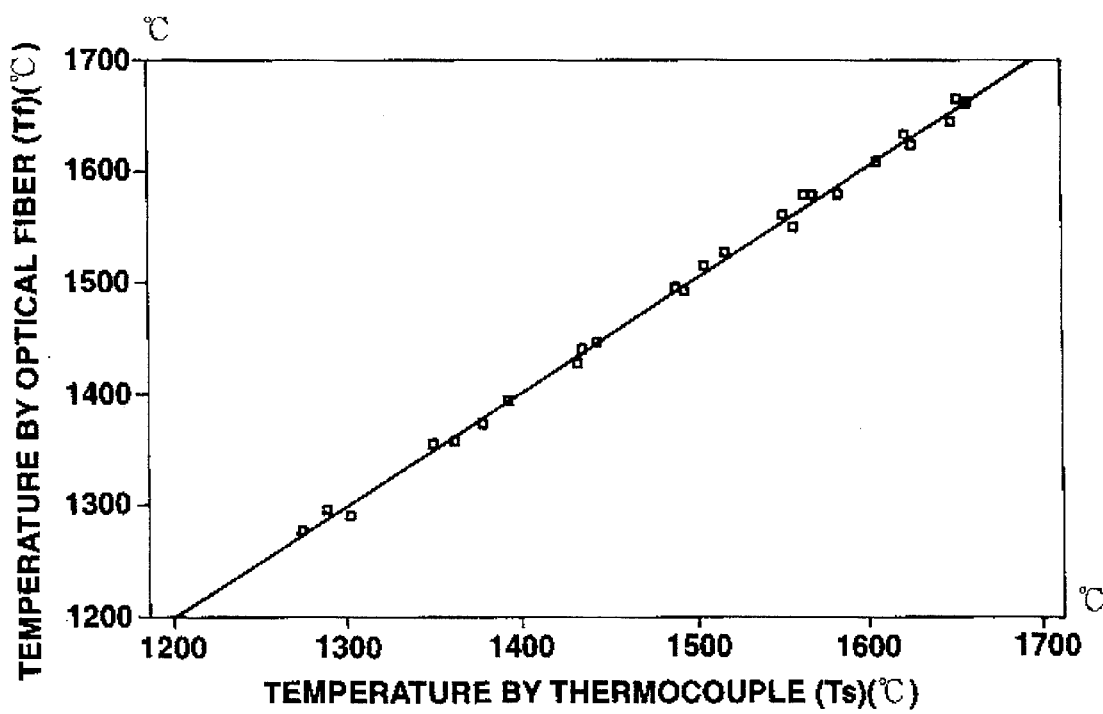
FIG. 10 is a graphic representation showing a comparison of a thermocouple indication value and an optical fiber indication value according to Example-3 of the present invention.

FIG. 10 shows the relation between the thermocouple indication value (Ts) and the optical fiber thermometer indication value (Tf) drawn on a graph of Ts as vertical axis and Tf as horizontal axis. The observed values with optical fiber are expressed by open square symbol "□". The open square marks in FIG. 10 disperse nearly on the straight line of Ts=Tf, which indicates that the observation was correct.

Figure 11:
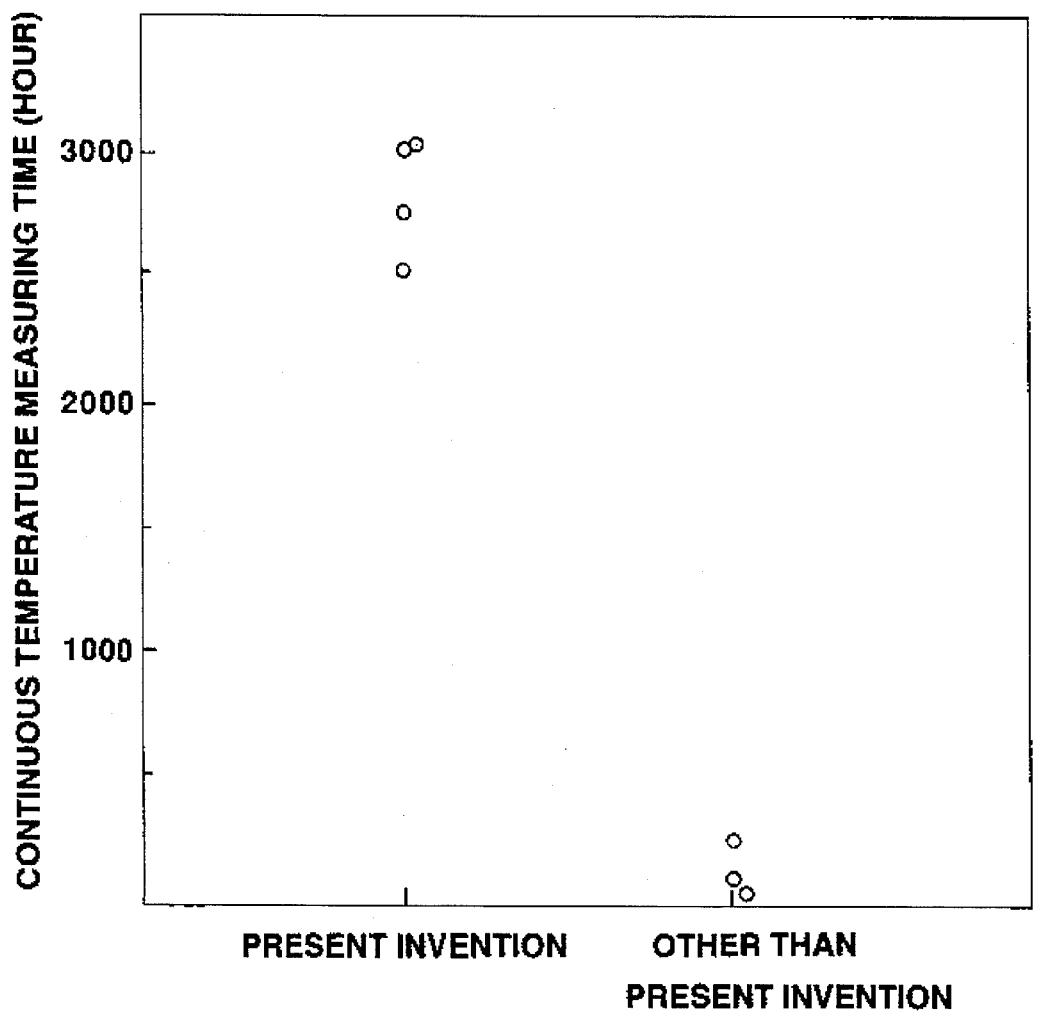
FIG. 11 graphically shows an effect in preventing a nozzle from clogging according to Example-3 of the present invention.

FIG. 11 compares the frequency of stoppage of (incapable of) fiber feeding between the case that the blown gas flow rate was kept to satisfy an eqution (2) and the case of other conditions (where only nitrogen gas was supplied and without following the condition of the eqution (2)). The figure shows that the mode of the invention allows a stable measurement.

Embodiment-3

According to the present invention, an end of an optical fiber covered with a metallic tube which is coiled inside of a drum in advance is sent out, passing through a temperature measurement nozzle and is immersed into a high temperature liquid in a container intermittently. And a radiation thermometer connected to another end of the optical fiber covered with a metallic tube measures a temperature of the high temperature liquid. Into a spacious gap formed between the inside wall of the nozzle and the outside periphery of the optical fiber covered with a metallic tube, a gas which prevents the nozzle's clogging is supplied so as to prevent the clogging of the nozzle.

In addition, since the invention conducts an intermittent feed of the optical fiber covered with a metallic tube, the consumption of the optical fiber is significantly reduced and the operating cost is also reduced compared with the mode of continuous feed. For example, operation of an ordinary converter (a steel-making vessel to decarburize molten iron by blowing to produce molten steel) uses approximately 15 minites of blowing for one batch. The operating condition consumes as long as 9 m of the optical fiber under the condition of a continuous feeding mode at a feed speed of 10 mm/sec. If, in this case, the optical fiber is sent out for 10 seconds continuously, followed by 10 seconds of non-feeding time, or under an intermittent feeding mode, the consumption of the optical fiber is reduced to a half. When the intermittent feed mode selects a cycle of 10 seconds of feeding and 20 seconds of no feeding, the consumption of the optical fiber is reduced to one third. Furthermore, when the intermittent feed mode selects a cycle of 5 seconds of feeding and 20 seconds of no feeding, the consumption of the optical fiber is reduced to one fifth, which accounts to 2 m or less of consumed optical fiber for a single batch.

When a long period of continuous temperature measurement is carried out, the temperature measurement nozzle becomes high in temperature. Under such a condition, a covering tube (metal) of the optical fiber contacts a metallic tube forming the nozzle to often induce fusion each other during a period of non-feeding of the optical fiber, which results in being incapable of the optical fiber feeding. According to the invention, however, the optical fiber feed means makes the optical fiber vibrate forward and backward along the direction of the feeding thereof during the period of no feeding of the optical fiber, so the fusion of metal is prevented and a stable temperature measurement is secured for a long period.

Example-4

Figure 12:
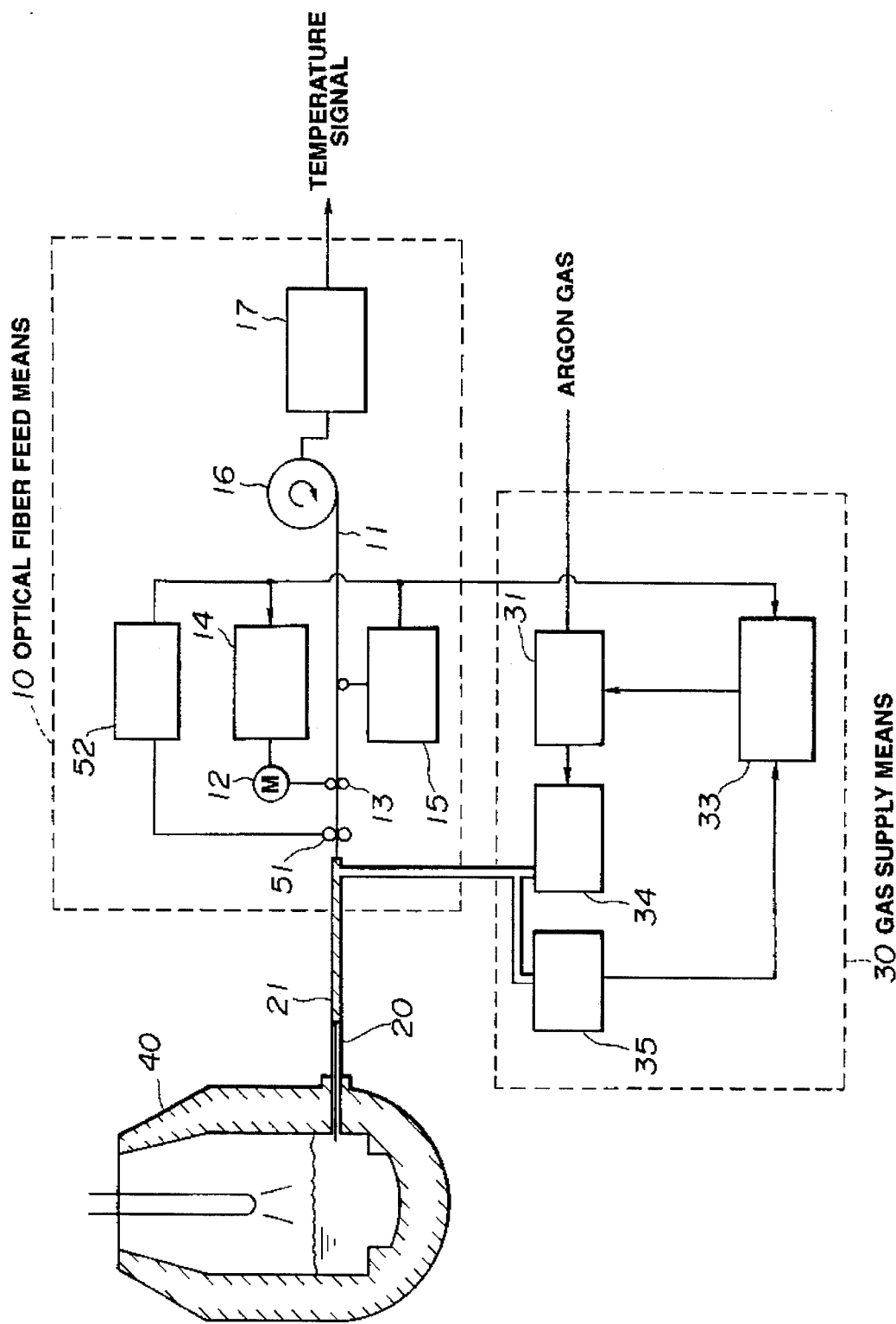
FIG. 12 is a block diagram illustrating an apparatus for measuring a temperature using an optical fiber of Example-4 of the present invention.

FIG. 12 illustrates a block diagram showing an aparatus for measuring a temperature of a high temperature liquid using an optical fiber according to Example-4 of the present invetion. The apparatus of the present example is additionally equipped with a vibrator 51 for vibrating a metal-covered optical fiver 11 covered with a metallic tube and a vibration controller 52 forward and backward along the direction of the feeding.

In the example of FIG. 12, when a detected speed value of the optical fiber and a detected pressure value of the blown gas are stayed in a normal range, the supply gas controller 33 selects an inert gas (argon in FIG. 12) having a cooling effect, as the gas which prevents the nozzle clogging, so as to protect the metal-covered optical fiber 11 which has been inserted into the nozzle 20 and the furnace 40.

Figure 13:
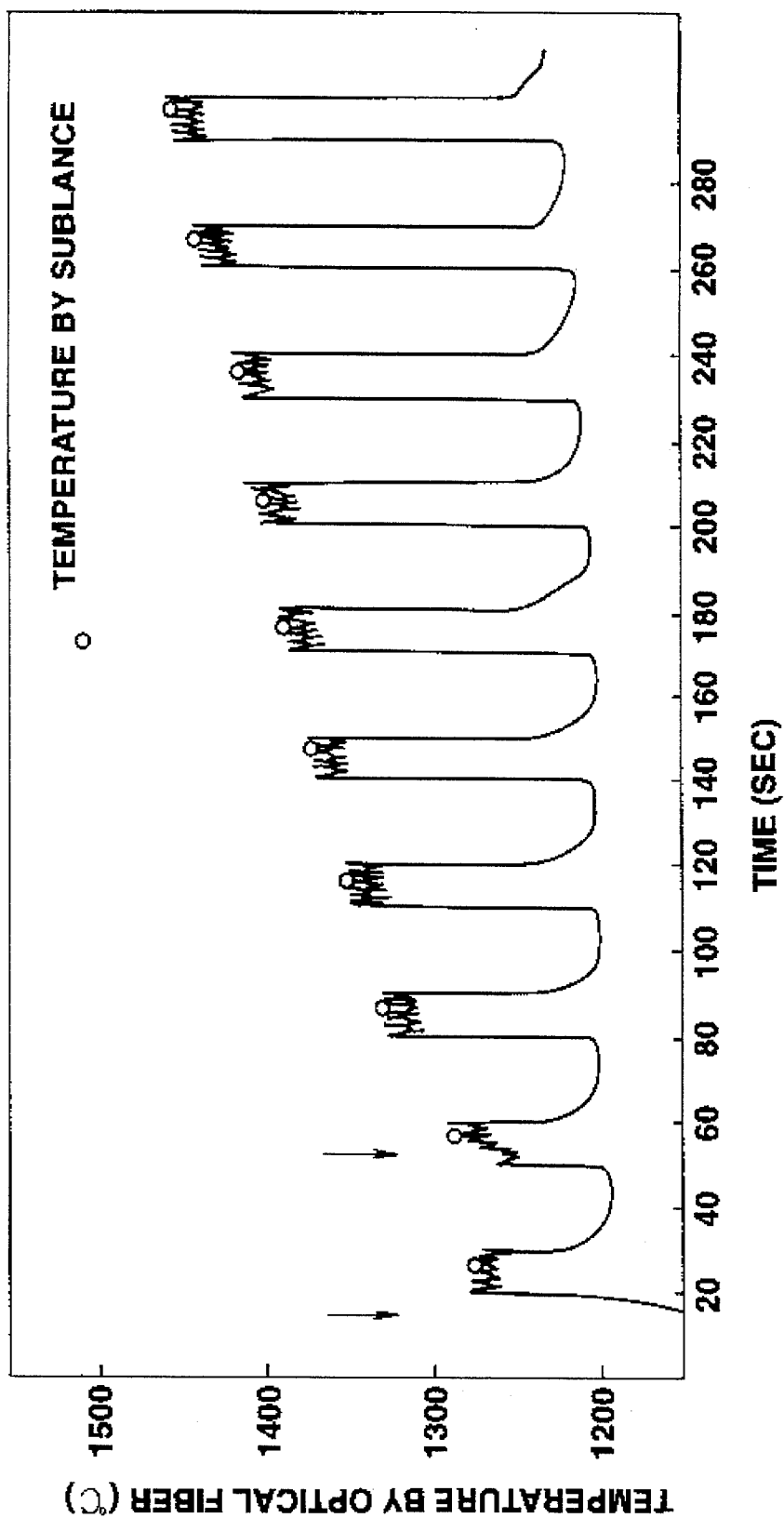
FIG. 13 is a graphic representation showing temperature measurement results according to Example-4 of the present invention.

FIG. 13 shows an example of the temperature measurement in a 10 ton converter using an optical fiber under the condition given below. The temperature measurement nozzle 20 was located at a level of 400 mm below a surface of the molten metal or lower on the side wall of the furnace.

(1) Nozzle for Temperature Measurement
Type: single tube nozzle
Inside/ouside diameter of the nozzle: 2.0 mm/4.0 mm
Material: SUS 310
(2) Optical Fiber
Structure: covered with stainless steel tube
Outer diameter: 1.2 mm
(3) Gas Blowing
Kind of gas: argon
Rate of blowing: 1.0 Nm$^3$/hr
(4) Optical Fiber Feed Speed: 10 mm/sec (20 seconds of no feed and 5 seconds of feed)
(5) Vibration of Optical Fiber: amplitude ±5 mm and frequency 180/min. (6) Molten Metal [C]: 4.2 to 0.02%
Temperature: 1250° to 1650° C.

The waveform varying in vertical direction in FIG. 13 indicates the temperature measured by optical fiber. The solid circles indicate the temperature determined by a thermocouple during intermittent sublance measurement for confirming the accuracy. The period of low waveform height of measured temperature is the period of non-feeding the optical fiber. The difference between a peak value measured by the optical fiber and the measured value using the thermocouple was 4° C. at an average. The error of 4° C. for the measured temperature at 1600° C. corresponded to the accuracy of 0.25%, which was of a considerably high accuracy.

Figure 14:
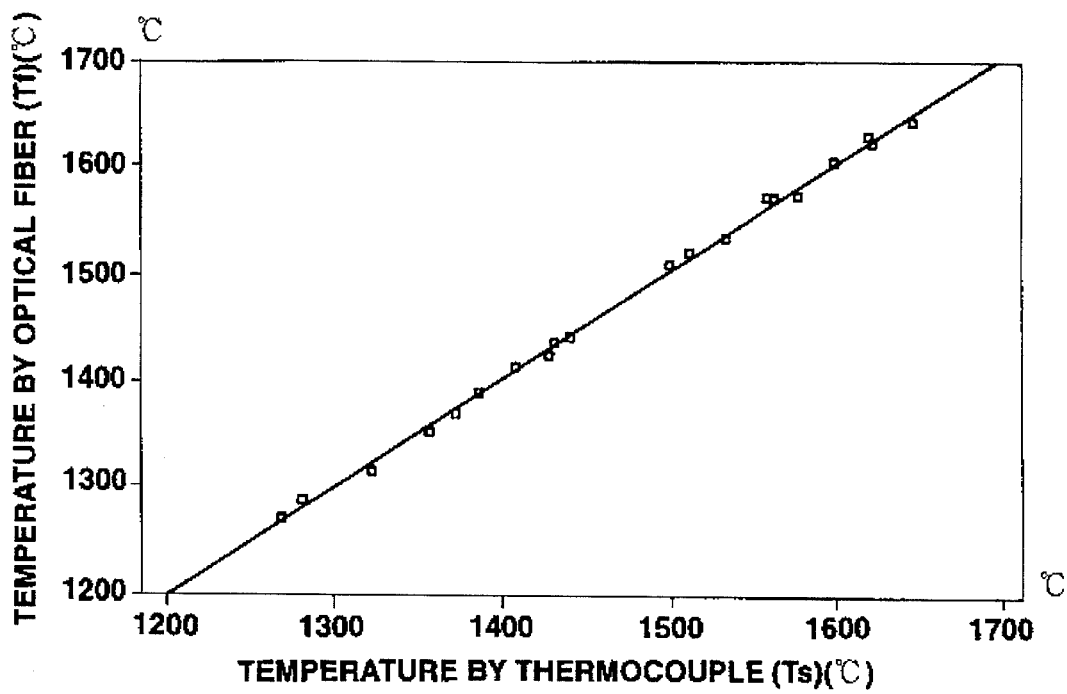
FIG. 14 is a graphic representation showing a comparison of a thermocouple indication value and an optical fiber indication value according to Example-4 of the present invention.
Figure 15:
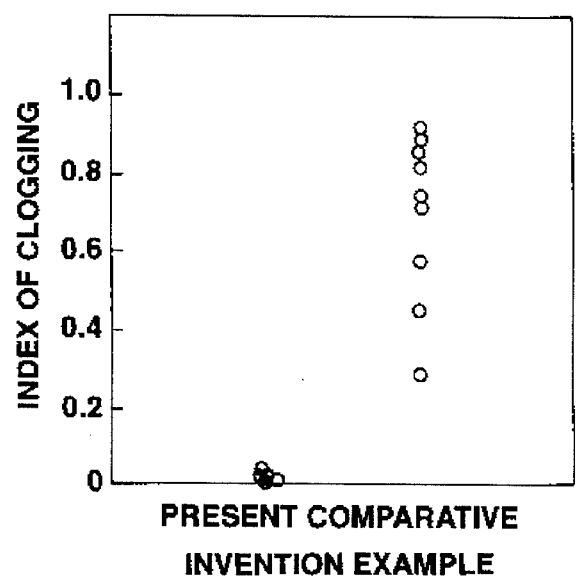
FIG. 15 graphically shows an effect in preventing a nozzle from clogging according to Example-4 of the present invention.

FIG. 15 shows the relation between the thermocouple indication value (Ts) and the optical fiber thermometer indication value (Tf) drawn on a graph of Ts as vertical axis and Tf as horizontal axis. The observed values with optical fiber are expressed by open square symbol of "□". The open square marks in FIG. 14 disperse nearly on the straight line of Ts=Tf, which indicates that the observation was correct.

FIG. 15 compares the frequency of stoppage of (incapable of) fiber feeding between the cases, during the period of non-feeding of optical fiber, that the optical fiber was vibrated at frequency of 180/min. with the amplitude of ±5 mm and that no vibration was given. The figure shows that the mode of the invention allows stable measurement.

In the present invention, a sealing device for preventing gas from leaking out of the optical fiber which passes through an optical fiber guide pipe is further equipped with an apparatus for measuring a temperature of a high temperature liquid using an optical fiber of the invention.

The sealing device seals an optical fiber which is sent out through the optical fiber guide to the direction of the sending out the optical fiber. The sealing device comprises: plurality of sealing rubbers with a rubber hole made in each of them, the sealing rubbers being placed along with a direction of an optical fiber axis, and the rubber hole having a diameter less than that of the optical fiber; a backing-up rings 3 built adjacently in between the sealing rubbers; and a lantern ring 4 built in adjacent to each of the sealing rubbers. And sealing oil is forced into the backing-up ring by pressure. A body of the sealing device accommodates these sealing rubbers, backing-up ring and lantern ring inside of the sealing device. On both sides of the sealing device, there are the optical fiber guide pipe jointed to the sealing device.

The sealing device makes use of elasticity which is a nature of rubber. In case that, for example, the gas which prevents the nozzle's clogging is supplied to the optical fiber guide pipe on a side of receiving the optical fiber, the sealing device prevents the gas leakage out of the optical fiber passing through the optical fiber guide pipe. When a temperature of a furnace is measured, the gas for preventing the nozzle clogging is made to flow into the optical fiber guide pipe by controlling both of a flow rate and a pressure and the gas is sent out from a tip end of the nozzle into the molten metal together with the optical fiber. Here the opticl fiber passes through the sealing rubbers with a narrow width (for example, 5 mm) and the rubber hole of a diameter (for example, 1.0 mm) smaller than a diameter (for example, 1.2 mm) of the optical fiber, and the sealing device makes a sealing against the side the optical fiber enters.

The seal device places plurality (for example, 4 pieces) of sealing rubbers which are narrow in width (for example, 5 mm) to improve its sealing feature and to reduce resistance against sliding movement. The backing-up ring built in between the sealing rubbers plays a role of preventing the sealing rubbers from being deformed.

Further, sealing oil is forced in between the sealing rubbers through the lantern ring by pressure to obtain lubrication work. The lubrication work reduces the resistance against the sliding movement of the optical fiber when it passes through the rubber hole of the sealing rubber.

Figure 16:
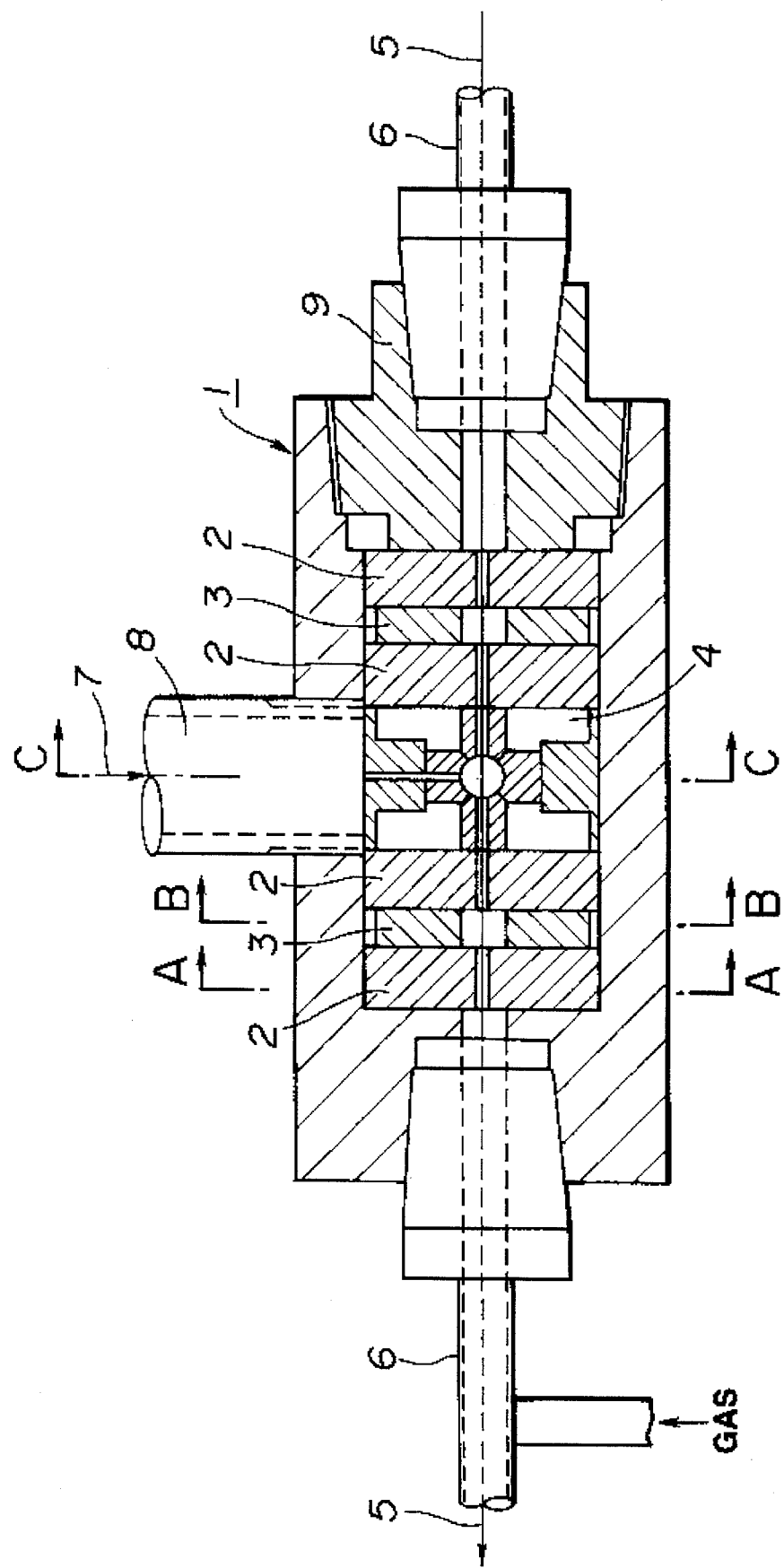
FIG. 16 a vertical section view illustrating an embodiment of a sealing device for sealing an optical of the present invention.

FIG. 16 is a section view illustrating a construction of the sealing device. As shown in the figure, a body of the sealing device has a hollow space formed. In this hollow space there are sealing rubbers 2, backing-up rings 3 and optical fiber guide pipe 6 placed on both left and right sides of lantern ring 4 which is made as a center of their placement. Therefore, in the present example, there are 4 pieces of sealing rubbers 2. The sealing rubbers, each have a tuber hole with a diameter of 1.0 mm in the center portion thereof, the diameter of the rubber hole is 1 mm slightly smaller than a diameter of 1.2 mm of the optical fiber 5. A thread cutting is given to both end sides of the body 1 of the sealing device and the optical fiber guide pipe 6 and a pressing 9 for sealing are respectively jointed to the body of the sealing device. Further to the pressing 9 a thread cutting is also given. The optical fiber guide pipe 6 on the feeding side of the optical fiber 5 is jointed to the pressing 9. Into the lantern ring 4, the sealing oil 7 is forced through a sealing oil inlet 8 by backing pressure. When the saeling oil is forced into the lantern ring 4 at a pressure which is a pressure of the preventive gas against the nozzle clogging +1 kg/cm², the pressure makes a backing pressure to the sealing rubber 2 in respect of the gas pressure for preventing the nozzle clogging which furtherns the sealing effect. Regarding kinds of the sealing oil, any oil having lubrication property can be available. If the rubber hole diameter of the sealing rubber 2 is smaller, the sealing feature is improved but the resistance against the passing movement of the optical fiber is increased which makes the feeding of the optical fiber impossible. Contrarily, if the hole diameter is larger, this makes a problem of the leakage. The hole diameter ranges preferably from 80 to 85% of the diameter of the optical fiber.

Figure 17:
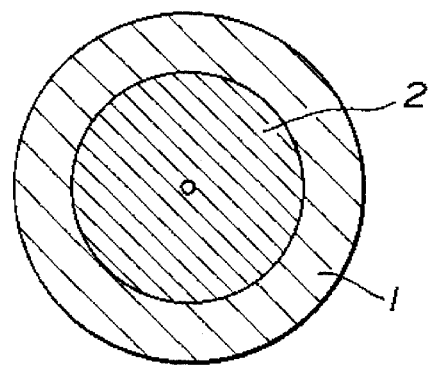
FIG. 17(A), 17(B) and 17(C) shows a sectional view taken on line A—A, line B—B and line C—C, respectively, of the embodiment of the sealing device of FIG. 16.
Figure 17:
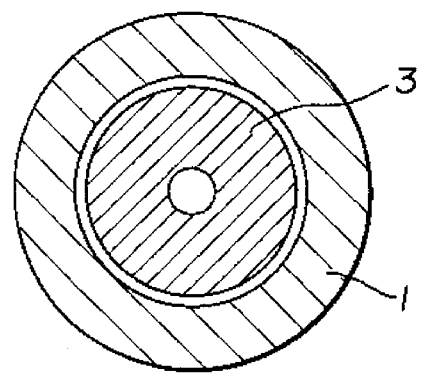
Figure 17:
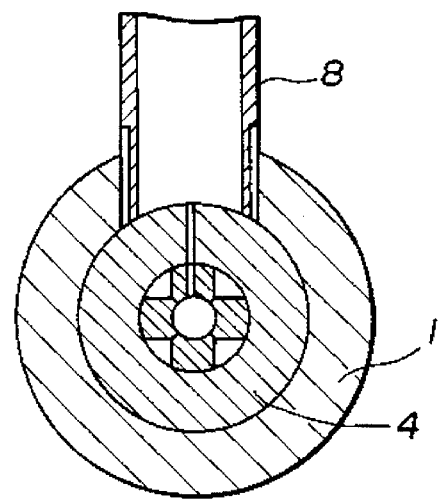

FIG. 17 (A), (B) and (C) illustrates sectional views taken respectively on lines A—A, B—B and C—C of FIG. 16.

In the example, when the optical fiber 5 passes through the optical fiber guide pipe 6, the seal rubber 2 is forced to be expanded because the diameter with 1.2 mm of the optical fiber is larger than that with 1.0 mm of the rubber hole of the sealing rubber. Making use of a force of the sealing rubber which reacts the expansion, the gas leakage out of the optical fiber is prevented. In addition, the effect in sealing is increased the more beeuse of the placement of the four pieces of the seal rubbers along with the axis direction of the optical fiber 5. When the optical fiber passes through the seal rubbers 2, the backing-up ring 3 is built in so as to supress the deformation of the sealing rubbers in the present example. Furthermore, for example, suppose that the backing-up ring hole be allowed to have its hole of 3 mm in diameter, then the sealing rubbers are enabled to have an elastic movement or a reacting force or the like. And in respect of the lubrication, any oil will do for the sealing oil 7 which is forced in the lantern ring 4 by pressure.

In the present example, the sealing rubber is 5 mm long in width to reduce resistance against sliding movement and 4 pieces of the sealing rubbers 2 are parallelly placed to increase its sealing effect when the optical fiber passes through the sealing rubbers 2. And the lantern ring 4 is set in between the sealing rubbers 2 and then, the sealing oil 7 is introduced through the sealing oil inlet 8 to further reduce the resistance against sliding movement of the optical fiber. As the results, the example of the sealing device works for sealing the reverse flow of the gas, which prevents the nozzle clogging, out of the optical fiber guide pipe 6 (the left hand side in FIG. 16). Thanks to this way of reducing the resistance of the sliding movement, the sealing to the optical fiber can be performed in a wide range of 50 to 800 mm/minite of feed speed of sending out the optical fiber. It should be noted that the feed speed is a speed at which the optical fiber passes by sliding movement.

Figure 18:
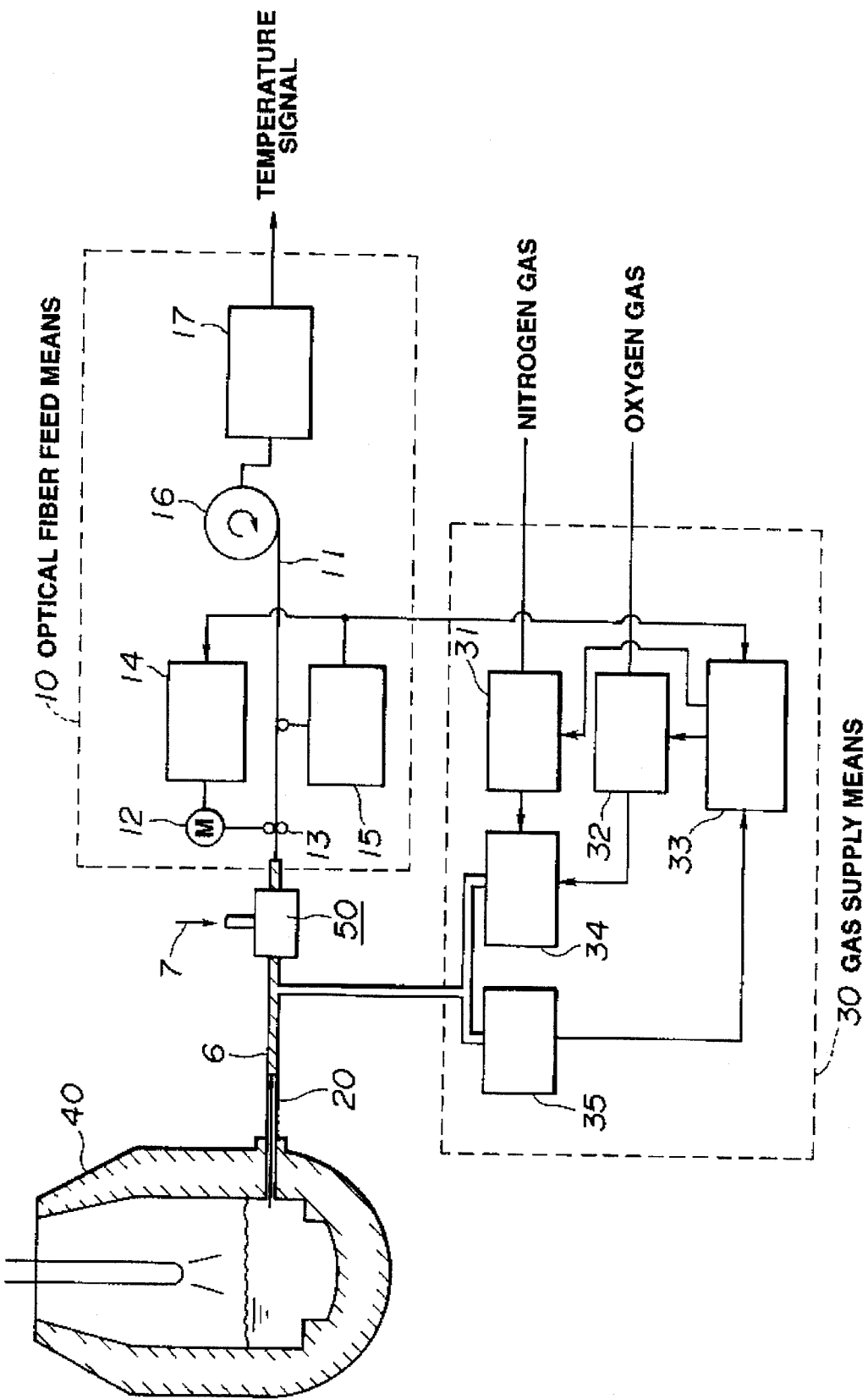
FIG. 18 is a block diagram illustrating an apparatus for measuring a temperature to which the sealing device of FIG. 16 is applied.

FIG. 18 is a block diagram illustrating an application of an optical fiber sealing device of FIG. 16 to an apparatus for measuring a temperature according to the present invention.

What is claimed is:

1. An apparatus for measuring a temperature of a high temperature liquid contained in a furnace, the apparatus comprising:

an optical fiber covered with a metallic tube;

a nozzle arranged on a furnace wall of the furnace and communicating with an interior of the furnace to contact said liquid contained therein, said metal-covered optical fiber being inserted through a passageway inside said nozzle;

gas supply means for supplying gas into the passageway inside said nozzle to prevent said nozzle from clogging, said gas being supplied at a flow rate small enough so as to prevent said liquid contained in the furnace from solidifying around said nozzle and large enough so as to prevent said liquid contained in the furnace from entering into said nozzle;

optical fiber feed means for feeding said metal-covered optical fiber through the passageway inside said nozzle into said liquid such that spectral light radiated from said liquid enters a tip of said metal-covered optical fiber and is propagated therealong; and a radiation thermometer, coupled to said metal-covered optical fiber, for determining a temperature of said liquid based on the spectral light propagated along said metal-covered optical fiber.

2. The apparatus of claim 1, further comprising selection means for selecting a gas to be supplied by said gas supply means.

3. The apparatus of claim 1, wherein said nozzle has a first end which contacts said liquid, and said gas supply means includes gas velocity control means for controlling a linear velocity of the gas to range from 50 to 500 Nm/sec at said first end of said nozzle.

4. The apparatus of claim 1, wherein a ratio of an inside diameter of the passageway inside said nozzle to an outside diameter of said metal-covered optical fiber ranges from 1.5 to 3.5.

5. The apparatus of claim 1, wherein said nozzle comprises brick.

6. The apparatus of claim 1, wherein said nozzle comprises ceramics.

7. The apparatus of claim 1, wherein said nozzle comprises a single metallic tube.

8. The apparatus of claim 1, wherein said nozzle comprises a single metallic tube lined on an inner surface thereof with ceramics to define the passageway inside said nozzle.

9. The apparatus of claim 1, wherein said nozzle comprises a double-tube having an inner tube, which defines the passageway inside said nozzle, and an outer tube, said metal-covered optical fiber being inserted through the inner tube and the gas being supplied into a gap formed between the inner tube and the outer tube.

10. The apparatus of claim 1, wherein the inner tube is lined on an inner surface thereof with ceramics.

11. The apparatus of claim 1, wherein said optical fiber feed means includes:
    feed speed detecting means for detecting a feed speed of said metal-covered optical fiber; and
    feed speed control means for controlling the feed speed based on a signal outputted from the feed speed detecting means, and said gas supply means includes:

pressure detecting means for detecting a pressure of the gas which is supplied into said nozzle; and gas selection means for selecting a gas to be supplied based on a signal outputted from the pressure detecting means.

12. The apparatus of claim 1, wherein said optical fiber feed means comprises a drum on which said metal-covered optical fiber is coiled, a roller for feeding said metal-covered optical fiber from the drum through the passageway inside said nozzle, a motor for driving the roller, a detector for detecting a feed speed of said metal-covered optical fiber and a speed controller for controlling the feed speed of said metal-covered optical fiber.

13. The apparatus of claim 1, wherein said optical fiber feed means includes a vibrator for vibrating said metal-covered optical fiber forwards and backwards in a direction of feeding during a stopping period when said metal-covered optical fiber is not being fed through said nozzle into said liquid.

14. The apparatus of claim 1, wherein said gas supply means includes flow rate control means for controlling a flow rate of the gas to satisfy the following equation:

$$\{Q \cdot M \cdot Cp \cdot (Tm-Tg)\}/(Tm-Tl) < 4 \times 10^7$$

where

Q: gas flow rate (Nl/min)

Tm: temperature of molten metal (K)

Tl: solidification temperature of molten metal (K)

Tg: temperature of gas (K)

Cp: specific heat of gas at temperature of molten metal (J/Kg·K)

M: molecular weight of gas.

15. The apparatus of claim 1, wherein said gas supply means includes flow rate control means for controlling a flow rate of the gas to satisfy the following equation:

$$\{Q \cdot M \cdot Cp \cdot (Tm-Tg)\}/(Tm-Tl) < 3 \times 10^6$$

where

Q: gas flow rate (Nl/min)

Tm: temperature of molten metal (K)

Tl: solidification temperature of molten metal (K)

Tg: temperature of gas (K)

Cp: specific heat of gas at temperature of molten metal (J/Kg·K)

M: molecular weight of gas.

16. The apparatus of claim 1, wherein said optical fiber feed means includes an optical fiber guide pipe through which said metal-covered optical fiber is guided through the passageway inside said nozzle, and a sealing device for sealing the optical fiber guide pipe and said metal-covered optical fiber.

17. The apparatus of claim 16, wherein said sealing device comprises:

a plurality of sealing rubbers each having a rubber hole therein, said sealing rubbers being provided axially along said metal-covered optical fiber, the rubber holes each having a diameter smaller than a diameter of said metal-covered optical fiber;

backing-up rings provided between adjacent sealing rubbers; and a lantern ring provided centrally with respect to said sealing rubbers, sealing oil being forced by pressure into the lantern ring;

said plurality of sealing rubbers, said backing-up rings and said lantern ring being provided inside a body of said sealing device, and said sealing device being coupled to the optical fiber guide pipe on both ends of the body of said sealing device.

18. A method for measuring a temperature of a high temperature liquid contained in a furnace comprising the steps of:

providing a nozzle having a passageway therein, said nozzle being arranged on a furnace wall of the furnace and communicating with an interior of the furnace to contact said liquid contained therein;

supplying gas into the passageway inside said nozzle to prevent said nozzle from clogging, said gas being supplied at a flow rate small enough so as to prevent said liquid contained in the furnace from solidifying around said nozzle and large enough so as to prevent said liquid contained in the furnace from entering into said nozzle;

feeding said metal-covered optical fiber through the passageway inside said nozzle into said liquid such that spectral light radiated from said liquid enters a tip of said metal-covered optical fiber and is propagated therealong; and determining a temperature of said liquid based on the spectral light propagated along said metal-covered optical fiber, said temperature being determined by a radiation thermometer coupled to said metal-covered optical fiber.

19. The method of claim 18, further comprising the step of selecting the gas to be supplied into the passageway inside said nozzle.

20. The method of claim 19, wherein said step of supplying gas comprises supplying a gas selected from the group consisting of an inert gas, a mixed gas of an inert gas and an oxidating gas.

21. The method of claim 18, wherein said nozzle has a first end which contacts said liquid, and said step of supplying gas comprises supplying gas such that the gas has a linear velocity ranging from 50 to 500 Nm/sec at said first end of said nozzle.

22. The method of claim 18, wherein said step of providing a nozzle comprises providing a nozzle such that a ratio of an inside diameter of the passageway inside said nozzle to an outside diameter of said metal-covered optical fiber ranges from 1.5 to 3.5.

23. The method of claim 18, wherein:

said nozzle comprises a double-tube having an inner tube, which defines the passageway inside said nozzle, and an outer tube;

said step of feeding said metal-covered optical fiber through the passageway inside said nozzle comprises feeding said metal-covered optical fiber through the inner tube; and said step of supplying gas comprises supplying the gas into a gap formed between the inner tube and the outer tube.

24. The method of claim 18, wherein said step of feeding said metal-covered optical fiber into said liquid includes the steps of:

detecting a feed speed of said metal-covered optical fiber; and controlling the feed speed based on the detected feed speed, and said step of supplying gas into said nozzle includes the steps of:

detecting a pressure of the gas being supplied into said nozzle; and selecting a gas to be supplied based on the detected pressure.

25. The method of claim 18, wherein said step of feeding said metal-covered optical fiber comprises continuously feeding said metal-covered optical fiber.

26. The method of claim 18, wherein said step of feeding said metal-covered optical fiber comprises intermittently feeding said metal-covered optical fiber.

27. The method of claim 26, wherein said step of feeding said metal-covered optical fiber includes feeding said metal-covered optical fiber and vibrating said metal-covered optical fiber forwards and backwards in a direction of feeding during a stopping period when said metal-covered optical fiber is not being fed through said nozzle into said liquid.

28. The apparatus of claim 18, wherein said step of supplying gas comprises supplying gas at a flow rate satisfying the following equation:

$$\{Q \cdot M \cdot Cp \cdot (TM-Tg)\}/(Tm-Tl) < 4 \times 10^7$$

where

Q: gas flow rate (Nl/min)

Tm: temperature of molten metal (K)

Tl: solidification temperature of molten metal (K)

Tg: temperature of gas (K)

Cp: specific heat of gas at temperature of molten metal (J/Kg·K)

M: molecular weight of gas.

29. The apparatus of claim 18, wherein said step of supplying gas comprises supplying gas at a flow rate satisfying the following equation:

$$\{Q \cdot M \cdot Cp \cdot (TM-Tg)\}/(Tm-Tl) < 3 \times 10^6$$

where

Q: gas flow rate (Nl/min)

Tm: temperature of molten metal (K)

Tl: solidification temperature of molten metal (K)

Tg: temperature of gas (K)

Cp: specific heat of gas at temperature of molten metal (J/Kg·K)

M: molecular weight of gas.

30. The method of claim 18, wherein said step of supplying gas comprises supplying gas at a flow rate satisfying the following equation:

$$3 \times 10^6 < \{Q \cdot M \cdot Cp \cdot (TM-Tg)\}/(Tm-Tl) < 4 \times 10^7$$

where

Q: gas flow rate (Nl/min)

Tm: temperature of molten metal (K)

Tl: solidification temperature of molten metal (K)

Tg: temperature of gas (K)

Cp: specific heat of gas at temperature of molten metal (J/Kg·K)

M: molecular weight of gas.

* * * * *

UNITED STATES PATENT AND TRADEMARK OFFICE
CERTIFICATE OF CORRECTION

PATENT NO. : 5,585,914
DATED : December 17, 1996
INVENTOR(S) : Mitsuo YAMASAKI et al.

It is certified that error appears in the above-indentified patent and that said Letters Patent is hereby corrected as shown below:

Column 2, line 7, replace "described" with --describes--;

Column 4, line 40, replace "seed" with --feeds--;

Column 8, line 35, replace "4" with --14--;

Column 13, line 57, replace "ratw" with --rate--;

Column 17, line 6, replace "tuber" with --rubber--;

line 22, replace "furtherns" with --furthers--;

Column 18, line 58 (claim 10, line 1), replace

"claim 1" with --claim 9--.

Signed and Sealed this

Eighth Day of July, 1997

*Attest:*

BRUCE LEHMAN

*Attesting Officer*  *Commissioner of Patents and Trademarks*